United States Patent
Nakayama

[11] Patent Number: 6,166,717
[45] Date of Patent: Dec. 26, 2000

[54] IMAGE PROCESSING APPARATUS

[75] Inventor: Sanchi Nakayama, Tokyo, Japan

[73] Assignee: NEC Corporation, Tokyo, Japan

[21] Appl. No.: 09/089,064

[22] Filed: Jun. 2, 1998

[30] Foreign Application Priority Data

Jun. 4, 1997 [JP] Japan .................................. 9-146467

[51] Int. Cl.⁷ ............................... G09G 5/37; G06T 5/00
[52] U.S. Cl. ........................................................ 345/136
[58] Field of Search ................................ 345/133, 135, 345/136; 382/266, 269

[56] References Cited

U.S. PATENT DOCUMENTS 5,343,558  8/1994  Akeley ..................................... 345/443
5,528,737  6/1996  Sfarti ....................................... 345/441

FOREIGN PATENT DOCUMENTS 4-139589  5/1992  Japan .
4-158061  6/1992  Japan .
6-68271   3/1994  Japan .

Primary Examiner—Jeffery Brier
Attorney, Agent, or Firm—Scully, Scott, Murphy & Presser

[57] ABSTRACT

An information processing apparatus includes a rendering Y-coordinate generating circuit, a span start point generating circuit, a span end point generating circuit, a sub-span start point generating circuit, a sub-span end point generating circuit, a leftmost sub-span start point generating circuit, a rightmost sub-span end point generating circuit, a rendering X-coordinate generating circuit, a sub-span start point comparison circuit, a sub-span end point comparison circuit, a sub-span difference calculating circuit, and a sub-span adding circuit. With this arrangement, sub-spans in a pixel with the coordinates XD and YD are concurrently processed to obtain the area of the overlapping portion between the pixel and a triangular region.

4 Claims, 17 Drawing Sheets

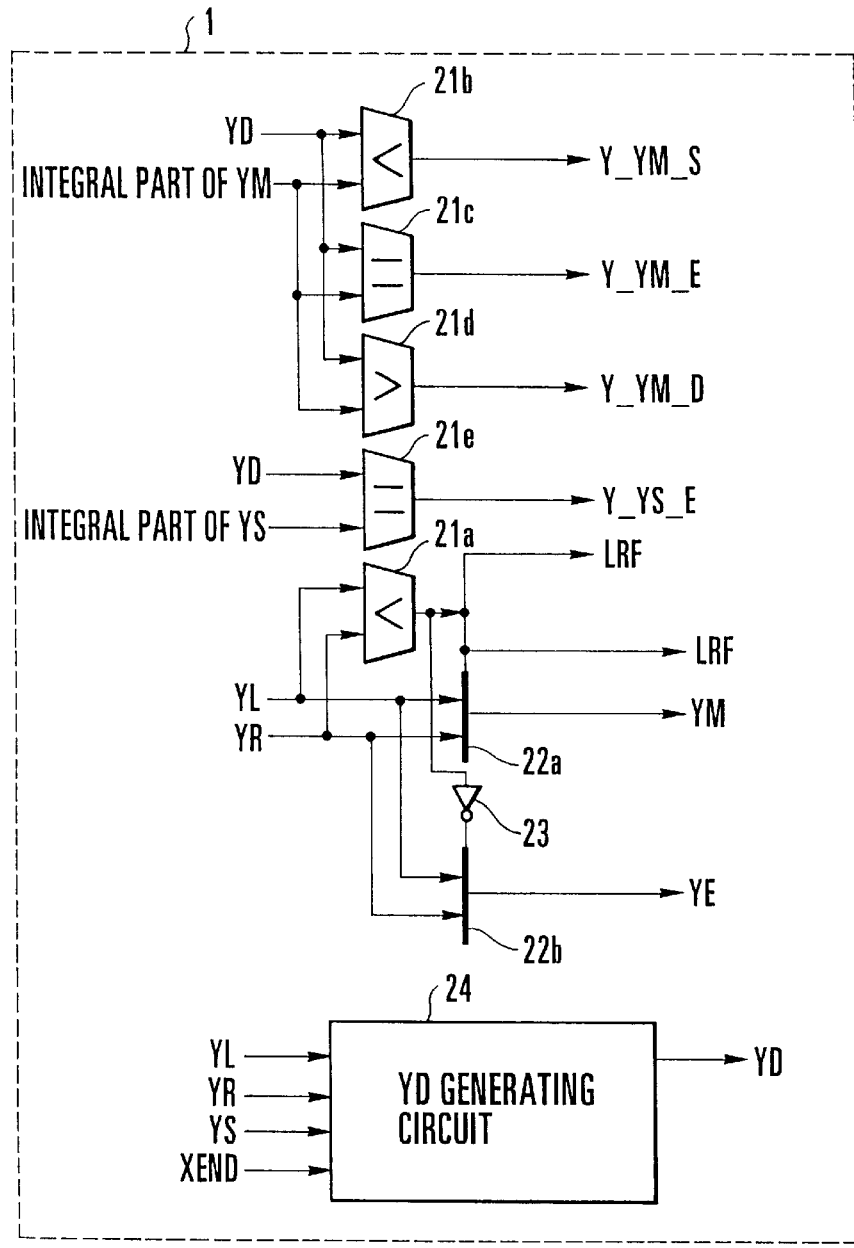
F I G. 5
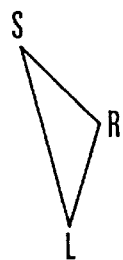
F I G. 6A
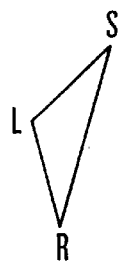
F I G. 6B

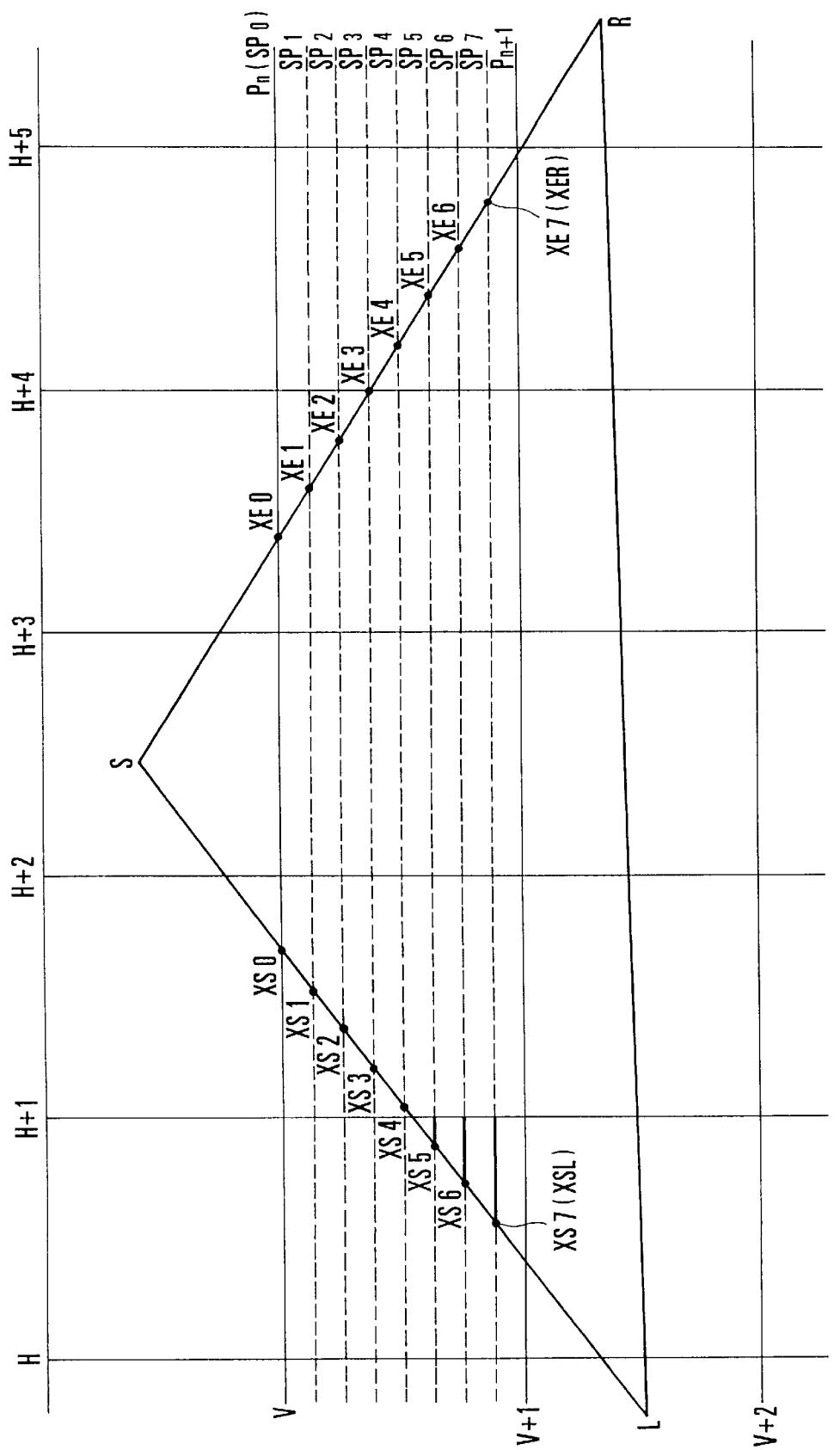

IMAGE PROCESSING APPARATUS

BACKGROUND OF THE INVENTION

The present invention relates to an image processing apparatus for executing anti-aliasing processing to remove the jagged portion of the edge of an output image and, more particularly, an image processing apparatus for rendering a triangular region surrounded with a vector image edge by obtaining the area of the triangular region in units of pixels overlapping the triangular region and performing rendering processing for the triangular region in units of pixels on the basis of the obtained area.

A conventional image processing apparatus for a 3D graphics technique of displaying a triangle performs rendering processing as follows.

First of all, a polygonal primitive is formed by using pieces of vertex unit information, i.e., X- and Y-coordinates, the slopes of sides with respect to sub-spans, and color value information. The color value and color incremental value of the start point of each span parallel to the X-axis are calculated on the basis of the X- and Y-coordinates of the vertexes of this polygonal primitive and the slopes of the respective sides. The color of each pixel within this span is interpolated in units of spans by using the color value and color incremental value of the start point of the span. The resultant color value of each pixel is stored in a frame buffer. The contents of this frame buffer are then displayed.

When the image data generated by this rendering processing is displayed on the screen, jaggies (jagged edge) appear, which become more noticeable as edge portions become horizontal or vertical. Such jaggies appear because of an attempt to render an ideal edge with a series of pixels arranged on a pixel grid.

This state of jaggies is called aliasing, and a technique of reducing such jaggies is called anti-aliasing. As an anti-aliasing method, the uniform averaging method disclosed in Japanese Patent Laid-Open No. 4-158061 is available. In this method, each pixel (picture element) is divided into N×M (N and M are natural numbers) sub-pixels, and raster calculation is performed with a high resolution. Thereafter, the luminance of each pixel is obtained by averaging the luminances of N×M sub-pixels.

The image processing apparatus disclosed in Japanese Patent Laid-Open No. 6-68271 is designed to execute anti-aliasing processing by using this uniform averaging method. In this apparatus, one pixel is divided into 16 sub-pixels, and one line is divided into four sub-lines. The intersections of the respective sub-lines and vectors are obtained. The sub-pixels between the intersections are painted in units of sub-lines, thereby painting 1-line pixels. Thereafter, the number of painted sub-pixels is counted in units of 1-line pixels to obtain the area of the region surrounded with the edge. The luminance of each pixel is determined in accordance with this area.

In the image processing apparatus disclosed in Japanese Patent Laid-Open No. 6-68271, however, since painting is performed in units of sub-lines, the processing speed is low.

SUMMARY OF THE INVENTION

It is an object of the present invention to provide an image processing apparatus which can execute anti-aliasing processing at high speed.

In order to achieve the above object, according to the present invention, there is provided an image processing apparatus for executing anti-aliasing processing to remove jagged portions of an edge of an output image in rendering processing for a triangular region surrounded with a vector image edge by obtaining an area of the triangular region in units of pixels overlapping the triangular region and performing rendering processing for the triangular region in units of pixels on the basis of the obtained area, comprising a rendering Y-coordinate generating circuit for outputting a Y-coordinate YD of each pixel, in a range from a Y-coordinate value of a vertex having a minimum Y-coordinate of Y-coordinates of three vertexes of the triangular region to a Y-coordinate value of a vertex having a maximum Y-coordinate, while increasing the coordinate YD by one every time processing for all pixels having the coordinate YD and overlapping the triangular region is complete, a span start point generating circuit for setting a point having a minimum X-coordinate, of points located on sides of the triangular region and having a minimum Y-coordinate, as a start point of a span $P_n$ which is parallel to an X-axis, has the Y-coordinate YD, and is currently processed, in an interval between the span $P_n$ and a span $P_{n+1}$ which has a Y-coordinate YD+1 and is to be processed next, and outputting an X-coordinate XA of the start point, a span end point generating circuit for setting a point having a maximum X-coordinate, of points located on the sides of the triangular region and having a minimum Y-coordinate, as an end point of the span $P_n$, and outputting an X-coordinate XB of the end point, a sub-span start point generating circuit for obtaining intersections having minimum X-coordinates, of intersections of the sides of the triangular region and a plurality of sub-spans that divide a region between the spans, in units of sub-spans at once, on the basis of the X-coordinate XA of the start point of the span output from the span start point generating circuit, setting the obtained intersections as start points of the respective sub-spans, and outputting X-coordinates of the respective start points, a sub-span end point generating circuit for obtaining intersections having maximum X-coordinates, of intersections of the sides of the triangular region and a plurality of sub-spans that divide a region between the spans, in units of sub-spans at once, on the basis of the X-coordinate XB of the end point of the span output from the span end point generating circuit, setting the obtained intersections as end points of the respective sub-spans, and outputting X-coordinates of the respective end points, a leftmost sub-span start point generating circuit for outputting a minimum X-coordinate XSL of the X-coordinates of the start points of the respective sub-spans output from the sub-span start point generating circuit, a rightmost sub-span end point generating circuit for outputting a maximum X-coordinate XER of the X-coordinates of the end points of the respective sub-spans output from the sub-span end point generating circuit, a rendering X-coordinate generating circuit for outputting an X-coordinate XD of each pixel, in a range from the X-coordinate XSL to the X-coordinate XER, while increasing the X-coordinate XD by one every time processing for one pixel is complete, a sub-span start point comparison circuit for comparing the X-coordinate XD of the pixel with the X-coordinate of the start point of each sub-span output from the sub-span start point generating circuit, and outputting a larger X-coordinate as the X-coordinate of the start point of each sub-span in the pixel with the coordinate XD, a sub-span end point comparison circuit for comparing a value obtained by adding one to the X-coordinate XD with the X-coordinate of the end point of each sub-span output from the sub-span end point generating circuit and outputting a smaller X-coordinate as the X-coordinate of the end point of each sub-span in the pixel with the coordinate XD, a sub-span difference calculating circuit for obtaining a valid length of each sub-span in the pixel with the coordinate XD by subtracting the X-coordinate of the start point of each sub-span, output from the sub-span start point comparison circuit, from the X-coordinate of the end point of each sub-span, output from the sub-span end point comparison circuit, and a sub-span adding circuit for obtaining a sum total of the valid lengths of the respective sub-spans output from the sub-span difference calculating circuit, and setting the result as an area of an overlapping portion between the pixel with the coordinate XD and the triangular region.

BRIEF DESCRIPTION OF THE DRAWINGS

FIG. 5 is a block diagram showing a rendering Y-coordinate generating circuit;

FIGS. 6A an 6B are views for explaining the meaning of an output LRF;

FIG. 20 is a view for explaining the operations of a rendering X-coordinate generating circuit, a sub-span start point comparison circuit, a sub-span end point comparison circuit, a sub-span difference calculating circuit, and a sub-span adding circuit.

DESCRIPTION OF THE PREFERRED EMBODIMENT

Figure 1:
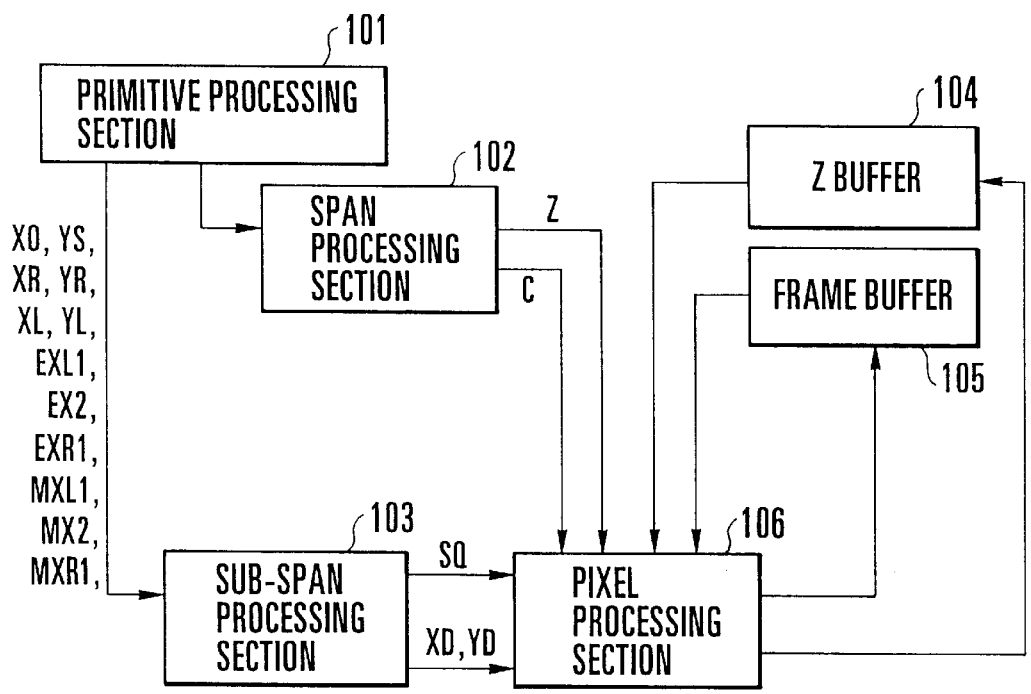
FIG. 1 is a block diagram showing an image processing apparatus according to an embodiment of the present invention.

An embodiment of the present invention will be described next with reference to the accompanying drawings. FIG. 1 shows an image processing apparatus according to an embodiment of the present invention.

A primitive processing section 101 obtains the coordinates of the vertexes of a triangle to be rendered and the slopes of the respective sides of the triangle.

A span processing section 102 generates depth information Z and color information C of the triangle in units of spans. In this case, a span is a line segment or line which is parallel to the X-axis and whose Y-coordinate value is an integer.

A sub-span processing section 103 obtains the edge of the triangle and an area SQ of the internal region of the triangle in units of pixels (picture elements), and outputs an X-coordinate XD and Y-coordinate YD of each pixel and the area SQ of each pixel. In this case, sub-spans are obtained by dividing the above span.

The depth information Z of the image that has been rendered is stored in a Z buffer 104 in units of pixels. The color information C of the image that has been rendered is stored in units of pixels.

A pixel processing section 106 calculates the depth information Z and the color information C of the triangle in units of pixels on the basis of the depth information Z and the color information C output from the span processing section 102. The pixel processing section 106 then compares the calculated depth information Z of each pixel of the triangle with the depth information Z of a corresponding pixel stored in the Z buffer 104. If the depth information Z of a given pixel of the triangle is smaller than that of the image that has been rendered, the pixel processing section 106 performs rendering processing for this pixel.

More specifically, the pixel processing section 106 mixes the color information C of this pixel to be rendered with the color information C of the corresponding pixel in the frame buffer 105 at a ratio between the above areas SQ that have been obtained with respect to this pixel. The pixel processing section 106 then updates the contents of the frame buffer 105 by storing this result as the new color information of the corresponding pixel in the frame buffer 105.

With this operation, the data stored in the Z buffer 104 and the frame buffer 105 are output from a rendering means to a display device, thereby displaying an image of the triangle on the display device.

The primitive processing section 101 obtains the coordinates of the vertexes of the triangle to be rendered and the slopes of the respective sides of the triangle in the following manner.

Figure 2:
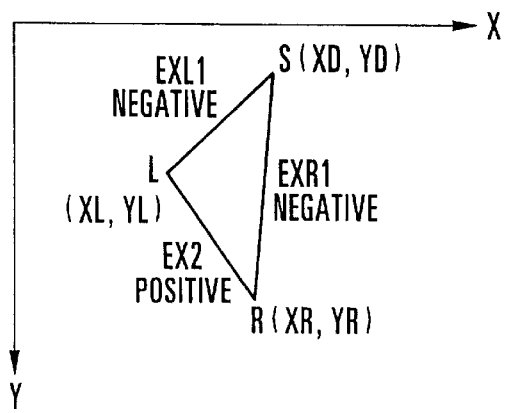
FIG. 2 is a view for explaining the definitions of the vertexes and sides of a triangle.

As shown in FIG. 2, the primitive processing section 101 sets the vertex, of the three vertexes of the triangle, which has the minimum Y-coordinate as a vertex S, and sequentially searches for the succeeding vertexes counterclockwise from the vertex S to set them as vertexes L and R. That is, the primitive processing section 101 searches for the vertexes counterclockwise from the vertex S, and sets the vertex that is searched out first as the vertex L, and the vertex that is searched out next as the vertex R.

The primitive processing section 101 then outputs the X-coordinate of the vertex S as X0, the Y-coordinate of the vertex S as YS, the X-coordinate of the vertex L as XL, the Y-coordinate of the vertex L as YL, the X-coordinate of the vertex R as XR, and the Y-coordinate of the vertex R as YR.

In addition, the primitive processing section 101 outputs the slope of a side SL as EXL1, the slope of a side LR as EX2, the slope of a side SR as EXR1, the sign of the slope EXL1 as MXL1, the sign of the slope EX2 as MX2, and the sign of the side SR slope EXR1 as MXR1. Note that these slopes correspond to the change amounts in the X-coordinates of the respective sides per Y-coordinate.

In this image processing apparatus, the directions of the X- and Y-axes are set as shown in FIG. 2. In this coordinate system, the X-coordinate value increases rightward, and the Y-coordinate value increases downward.

The X- and Y-coordinate values and slopes EXL1, EX2, and EXR1 of the vertexes S, L, and R are real numbers. In an actual circuit, these real numbers are expressed as binary values each consisting of several ten bits. As shown in FIG. 2, the sign of each slope is set such that the slope of a side that slants to the right is positive, and the slope of a side that slants to the left is negative.

Figure 3:
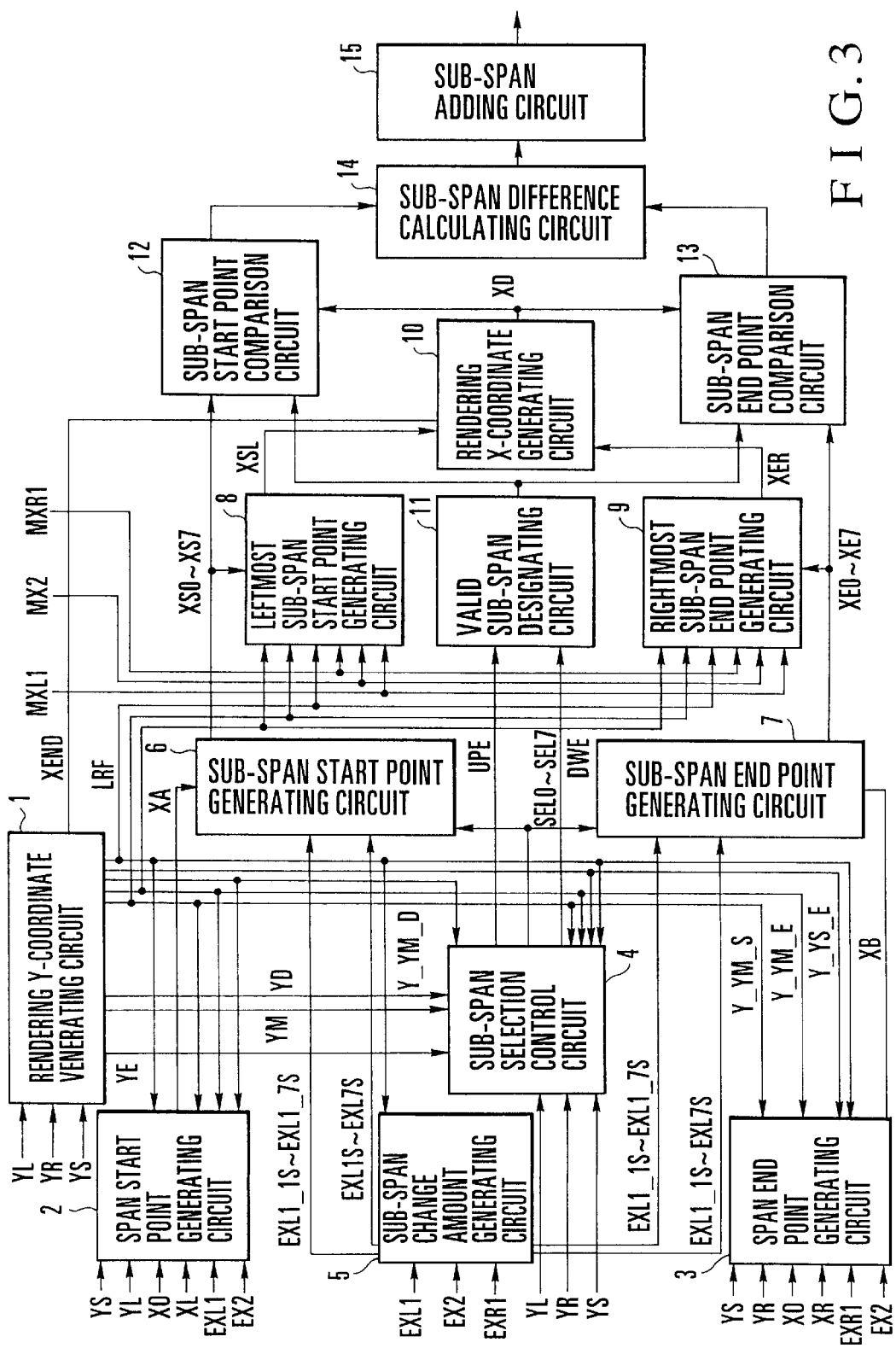
FIG. 3 is a block diagram showing a sub-span processing section.
Figure 4:
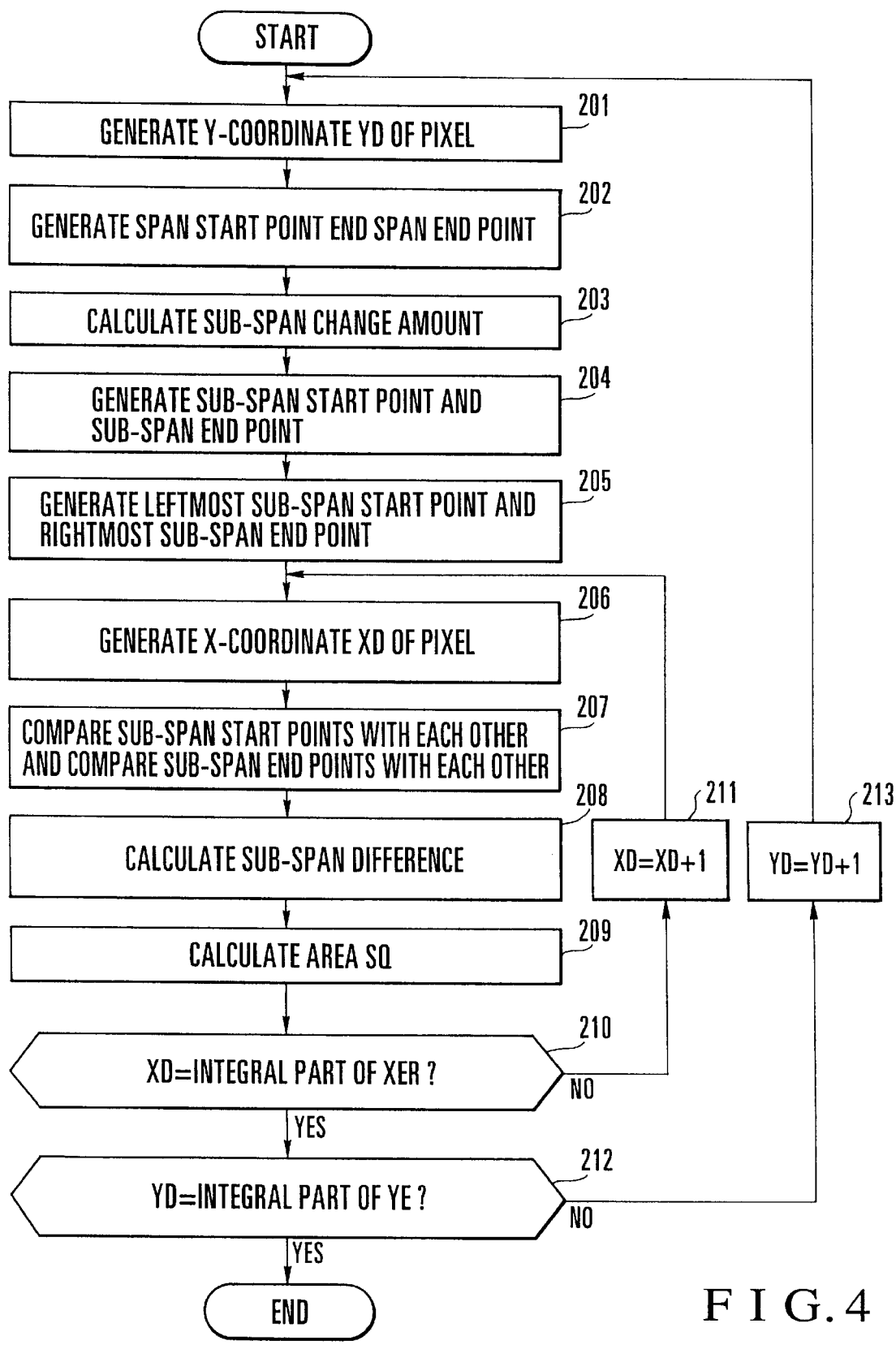
FIG. 4 is a flow chart for explaining the operation of the sub-span processing section.

The operation of the sub-span processing section 103 will be described next. FIG. 3 shows the sub-span processing section 103. FIG. 4 explains the operation of the sub-span processing section 103.

A rendering Y-coordinate generating circuit 1 outputs the Y-coordinate YD (integral value) of each pixel overlapping the triangle, in the range from the integral part of the Y-coordinate YS of the vertex S to the integral part of YE, while increasing the Y-coordinate YD by one every time processing for a pixel having the coordinate YD and overlapping the triangle is complete (step 201 in FIG. 4). FIG. 5 shows the rendering Y-coordinate generating circuit 1.

A comparator 21a compares the Y-coordinate YL of the vertex L with the Y-coordinate YR of the vertex R. If YL is smaller than YR (YL<YR), an output LRF is set to "1". If YL is equal to or larger than YR (YL≧YR), the output LRF is set to "0". When the signal LRF is "0", a triangle like the one shown in FIG. 6A is obtained. When the signal LRF is "1", a triangle like the one shown in FIG. 6B is obtained.

A selector 22a selects YR when the output signal LRF from the comparator 21a is "0", and YL when the signal LRF is "1". The selector 22a outputs this selection result as YM. That is, YM is the Y-coordinate value of the vertex that is located between the vertex S having the minimum Y-coordinate and the vertex having the maximum Y-coordinate. In the triangle shown in FIG. 6A, the Y-coordinate YM corresponds to YR. In the triangle shown in FIG. 6B, the Y-coordinate YM corresponds to YL.

A selector 22b selects YR when the output signal from an inverter 23 for logically inverting the signal LRF is "0", and YL when the output signal from the inverter 23 is "1". The selector 22b outputs this selection result as YE. That is, YE is the Y-coordinate value of the vertex having the largest Y-coordinate of the Y-coordinates of the three vertexes of the triangle. The triangle in FIG. 6A corresponds to YL. The triangle in FIG. 6B corresponds to YR.

A YD generating circuit 24 outputs the Y-coordinate YD (integral value) of each pixel in the range from the integral part of the Y-coordinate YS of the vertex S to the integral part of YE while adding one to YD every time a signal XEND (to be described later) is input. That is, the YD generating circuit 24 outputs the integral part of YS as YD first, and then adds one to YD to output new YD when the signal XEND is input. Subsequently, every time the signal XEND is input, the YD generating circuit 24 adds one to the current value of YD to output new YD, and repeats this processing until YD reaches the integral part of YE.

Subsequently, a comparator 21b compares the Y-coordinate YD of each pixel output from the YD generating circuit 24 with the integral part of the coordinate YM. If YD is smaller than the integral part of YM, the comparator 21b sets an output Y_YM_S to "1". If YD is equal to or larger than the integral part of YM, the comparator 21b sets the output Y_YM_S to "0".

A comparator 21c compares the Y-coordinate YD of each pixel with the integral part of the coordinate YM. If YD is equal to the integral part of YM, the comparator 21c sets an output Y_YM_E to "1". If YD is not equal to the integral part of YM, the comparator 21c sets the output Y_YM_E to "0".

A comparator 21d compares the Y-coordinate YD of each pixel with the integral part of the coordinate YM. If YD is larger than the integral part of YM, the comparator 21d sets an output Y_YM_D to "1". If YD is equal to or smaller than the integral part of YM, the comparator 21d sets the output Y_YM_D to "0".

A comparator 21e compares the Y-coordinate YD of each pixel with the integral part of the coordinate YS. If YD is equal to the integral part of YS, the comparator 21e sets an output Y_YS_E to "1". If YD is not equal to the integral part of YS, the comparator 21e sets the output Y_YS_E to "0".

In the interval between a span $P_n$ which is currently processed and corresponds to the Y-coordinate YD and a span $P_{n+1}$ which is to be processed next and corresponds to a Y-coordinate YD+1, a span start point generating circuit 2 sets one point having the minimum X-coordinate, of the points having the minimum Y-coordinate on the sides of the triangle, as the start point of the span $P_n$, and outputs an X-coordinate XA of this start point (step 202 in FIG. 4).

Figure 7:
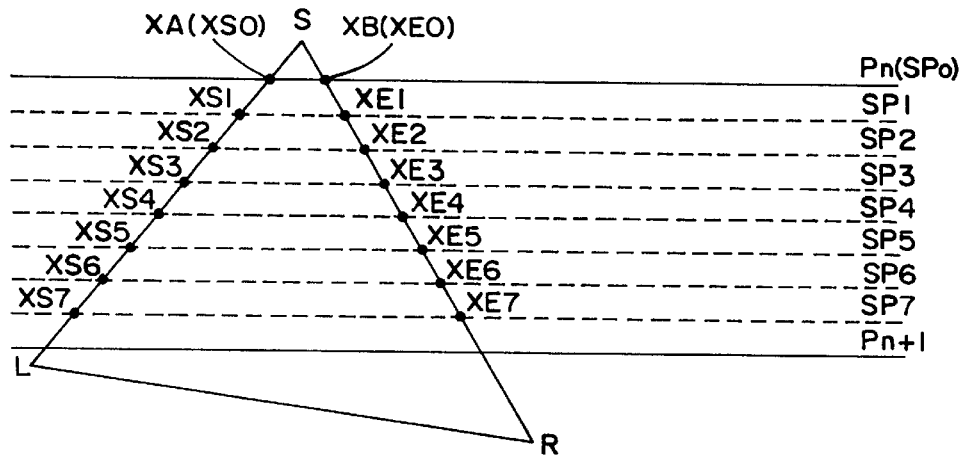
FIG. 7 is a view for explaining spans, sub-spans, span start points, span end points, sub-span start points, and sub-span end points.

For example, in the triangle shown in FIG. 7, the span start point corresponds to the position of XA. Note that the X-coordinate XA of the start point is a real number, which is expressed as a binary value consisting of several ten bits in an actual circuit.

Figure 8:
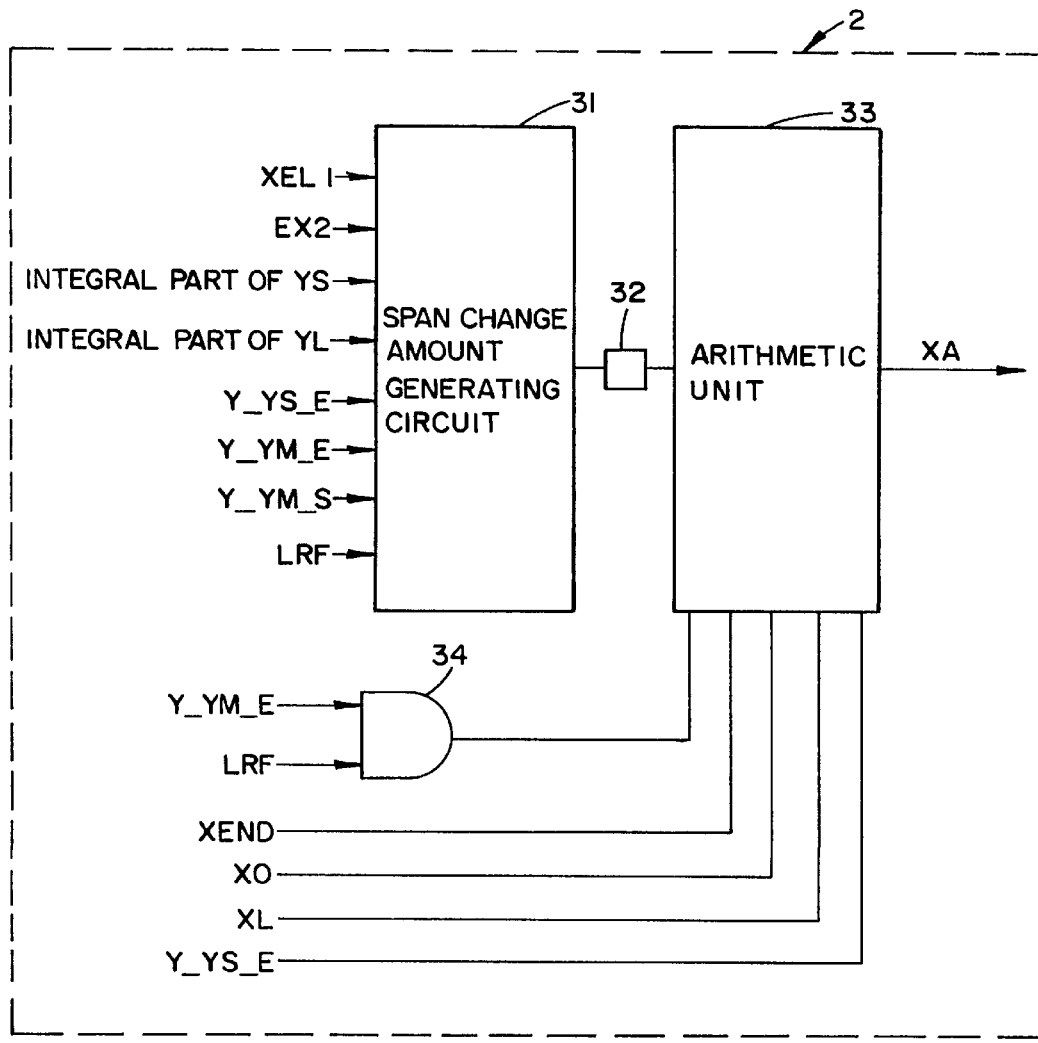
FIG. 8 is a block diagram showing a span start point generating circuit.

FIG. 8 shows the span start point generating circuit 2. A span change amount generating circuit 31 generates a value corresponding to the change amount from the X-coordinate XA of the start point of the span currently processed to the X-coordinate of the start point of the span to be processed next. Table 1 indicates the operation of the span change amount generating circuit 31. In table 1, "x" indicates that either "0" or "1" can be set.

TABLE 1

Operation of Span Change Amount Generating Circuit 31

| Y_YS_E | Y_YM_E | Y_YM_S | LRF | Output |
|--------|--------|--------|-----|--------|
| 0 | x | x | 0 | "1000" × EXL1 |
| 1 | x | x | 0 | ("1000" – ("0" & YS decimal part)) × EXL1 |
| 0 | 0 | 1 | 1 | "1000" × EXL1 |
| x | 1 | 0 | 1 | ("1000" – ("0" & YL decimal part)) × EX2 |
| 1 | 0 | 1 | 1 | ("1000" – ("0" & YS decimal part)) × EXL1 |
| 0 | 0 | 0 | 1 | "1000" × EX2 |

Referring to Table 1, ""1000"×EXL1" indicates that EXL1 is multiplied by the 4-bit value "1000", and "("1000"–("0" & YS decimal part))×EXL1" indicates that "0" is added to the head of the three bits of the decimal part of YS to extend the decimal part to four bits, and the difference between "1000" and the 4-bit value is multiplied by EXL1. The same applies to the remaining portions.

The output from the span change amount generating circuit 31 is shifted to the right by three bits by a shifter 32.

This shifting operation result is then input to an arithmetic unit 33. Note that this shifting operation can be implemented by interchanging the connections for the respective bits of the output of the span change amount generating circuit 31.

An AND circuit 34 calculates the AND between the signal Y_YM_E and the signal LRF, and inputs the AND to the arithmetic unit 33.

The operation of the arithmetic unit 33 will be described next with reference to FIGS. 9A to 9H. First of all, when YD=integral part of YS, the start point of a first span $P_0$ is the vertex S. The arithmetic unit 33 therefore outputs the X-coordinate X0 of the vertex S as the X-coordinate XA of the start point of the span when YD=integral part of YS. The arithmetic unit 33 keeps outputting the X-coordinate XA of this start point until I-he processing for the span $P_0$ is complete.

Figure 9A:
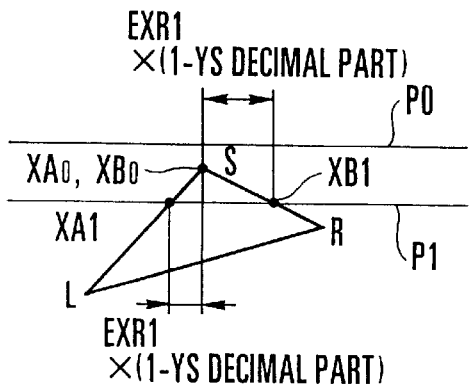
FIGS. 9A to 9H are views for explaining the operation of the span start point generating circuit.

Assume that the triangle has a shape like the one shown in FIG. 9A with LRF="0" (the output from the AND circuit 34 is "0"), and Y_YS_E is "1", i.e., the vertex S is present between the current span $P_0$ and a next span $P_1$. In this case, as is apparent from the outputs from the span change amount generating circuit 31 and the shifter 32, the change amount between an X-coordinate $XA_0$ of the start point of the span $P_0$ and an X-coordinate $XA_1$ of the start point of the span $P_1$ to be processed next is EXL1×(1−YS decimal part).

When the signal XEND (to be described later) is input, therefore, the arithmetic unit 33 adds EXL1×(1−YS decimal part) to the X-coordinate XA (i.e., X0) of the start point of the current span, and outputs the sum as the X-coordinate XA of the start point of the new span when the processing for the next span $P_1$ starts. The arithmetic unit 33 keeps outputting the X-coordinate XA of this start point until the processing for the span $P_1$ is complete. Note that the signal XEND becomes "1" when the last pixel on one span is processed. When the processing for the last pixel after the signal XEND is output, the processing for the next span is started.

Figure 9B:
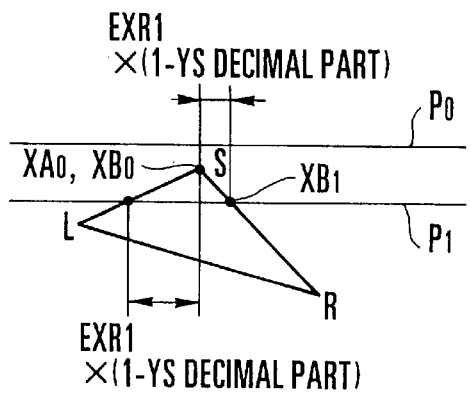

Similarly, assume that the triangle has a shape like the one shown in FIG. 9B with LRF="1", and Y_YS_E, Y_YM_E, and Y_YM_S are respectively "1", "0", and "0", i.e., the vertex S is present between the current span $P_0$ and a next span $P_1$. In this case, as is apparent from the outputs from the span change amount generating circuit 31 and the shifter 32, the change amount between the X-coordinate $XA_0$ of the start point of the span $P_0$ and the X-coordinate $XA_1$ of the start point of the span $P_1$ to be processed next is EXL1×(1−YS decimal part).

Upon reception of the signal XEND, therefore, the arithmetic unit 33 adds EXL1×(1−YS decimal part) to the X-coordinate XA (X0) of the start point of the current span, and outputs the sum as the X-coordinate XA of the start point of the new span when the processing for the next span $P_1$ starts.

Figure 9C:
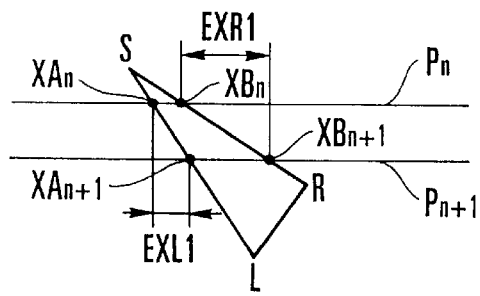

Assume that Y_YS_E is set to "0" with respect to the triangle with LRF="0", i.e., the current span $P_n$ and the next span $P_{n+1}$ are located at the positions in FIG. 9C with respect to the triangle. In this case, as is apparent from the outputs from the span change amount generating circuit 31 and the shifter 32, the change amount between an X-coordinate $XA_n$ of the start point of the span $P_n$ and an X-coordinate $XA_{n+1}$ of the start point of the span $P_{n+1}$ to be processed next is EXL1.

Upon reception of the signal XEND, therefore, the arithmetic unit 33 adds EXL1 to the X-coordinate XA of the start point of the current span, and outputs the sum as the X-coordinate XA of the start point of the new span when the processing for the next span $P_{n+1}$ starts.

Figure 9D:
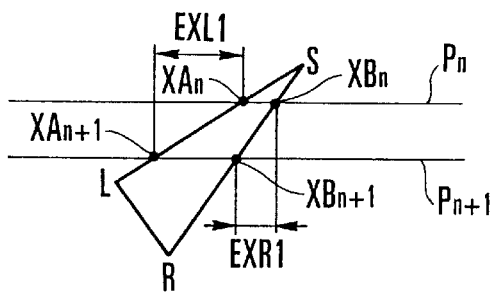

Similarly, assume that Y_YS_E, Y_YM_E, and Y_YM_S are respectively set to "0", "0", and "1" with respect to the triangle with LRF="1", i.e., the current span $P_n$ and the next span $P_{n+1}$ are located at the positions in FIG. 9D with respect to the triangle. In this case, the charge amount between the X-coordinate $XA_n$ of the start point of the span $P_n$ and the X-coordinate $XA_{n+1}$ of the start point of the span $P_{n+1}$ to be processed next is EXL1.

Upon reception of the signal XEND, therefore, the arithmetic unit 33 adds EXL1 to the X-coordinate XA of the start point of the current span, and outputs the sum as the X-coordinate XA of the start point of the new span when the processing for the next span $P_{n+1}$ starts.

Figure 9E:
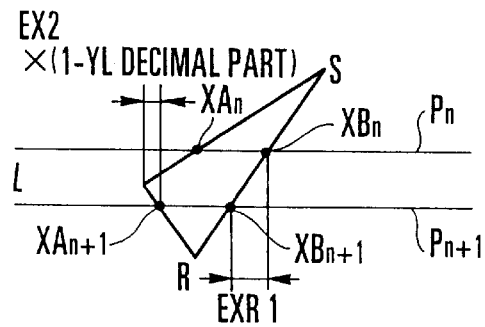

Assume that the triangle has a shape like the one shown in FIG. 9E with LRF="1", and Y_YM_E and Y_YM_S are respectively set to "1" and "0", i.e., the vertex L having the Y-coordinate YM is present between the current span $P_n$ and the next span $P_{n+1}$. In this case, as is apparent from the outputs from the span change amount generating circuit 31 and the shifter 32, the change amount between the X-coordinate XL of the vertex L and the X-coordinate $XA_{n+1}$ of the start point of the next span $P_{n+1}$ is EX2×(1−YL decimal part).

Upon reception of the signal XEND, therefore, the arithmetic unit 33 adds EX2×(1−YL decimal part) to the X-coordinate XL of the vertex L, and outputs the sum as the X-coordinate XA of the start point of the new span when the processing for the next span $P_{n+1}$ starts.

Figure 9F:
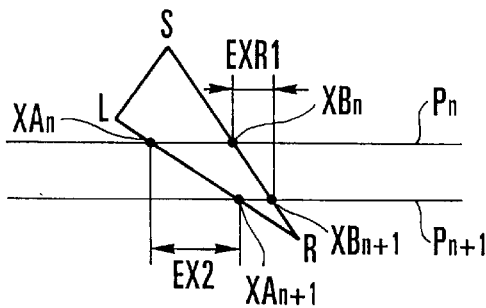

Assume that Y_YS_E, Y_YM_E, and Y_YM_S are respectively set to "0", "0", and "0" with respect to the triangle with LRF="1", i.e., the current span $P_n$ and the next span $P_{n+1}$ are located at the positions in FIG. 9F with respect to the triangle. In this case, the change amount between the X-coordinate $XA_n$ of the start point of the span $P_n$ and the X-coordinate $XA_{n+1}$ of the start point of the next span $P_{n+1}$ is EX2.

Upon reception of the signal XEND, therefore, the arithmetic unit 33 adds EX2 to the X-coordinate XA of the start point of the current span, and outputs the sum as the X-coordinate XA of the start point of the new span when the processing for the next span $P_{n+1}$ starts.

In either case, the arithmetic unit 33 keeps outputting the same value until the processing for the current span is complete.

In the interval between the span $P_n$ which is currently processed and corresponds to the Y-coordinate YD and the span $P_{n+1}$ which is to be processed next and corresponds to the Y-coordinate YD+1, a span end point generating circuit 3 sets one point having the maximum X-coordinate, of the points having the minimum Y-coordinate on the sides of the triangle, as the end point of the span $P_n$, and outputs an X-coordinate XB of this end point concurrently with the output from the span start point generating circuit 2 (step 202 in FIG. 4).

For example, in the triangle shown in FIG. 7, the span end point corresponds to the position of XB. Note that the X-coordinate XB of the end point is a real number, which is expressed as a binary value consisting of several ten bits in an actual circuit.

Figure 10:
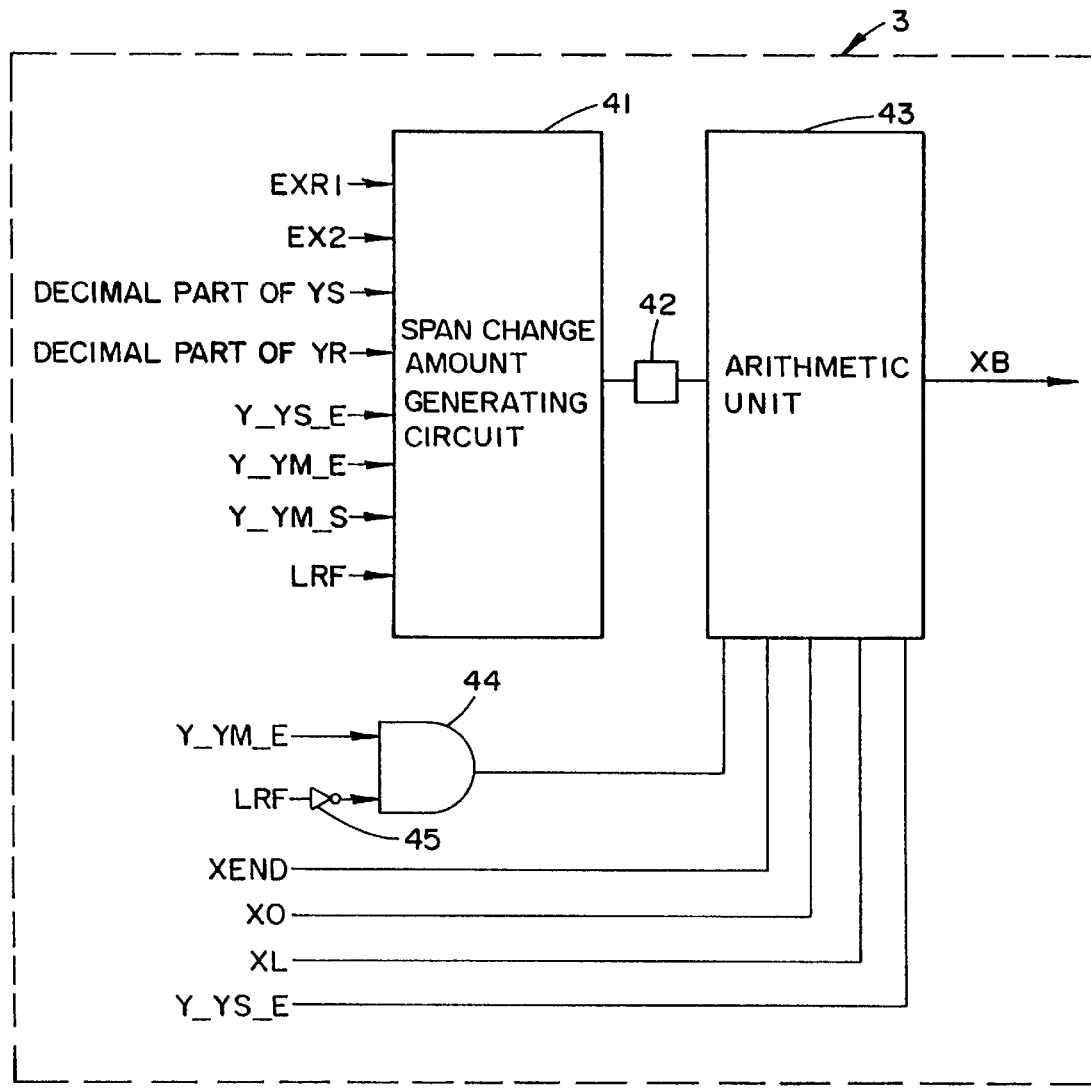
FIG. 10 is a block diagram showing a span end point generating circuit.

FIG. 10 shows the span end point generating circuit 3. A span change amount generating circuit 41 generates a value corresponding to the change amount from the X-coordinate XB of the end point of the span currently processed to the X-coordinate of the end point of the span to be processed next. Table 2 indicates the operation of the span change amount generating circuit 41. In table 1, "x" indicates that either "0" or "1" can be set.

TABLE 2

Operation of Span Change Amount Generating Circuit 41

| Y_YS_E | Y_YM_E | Y_YM_S | LRF | Output |
|---|---|---|---|---|
| 0 | x | x | 1 | "1000" × EXR1 |
| 1 | x | x | 1 | ("1000" – ("0" & YS decimal part)) × EXR1 |
| 0 | 0 | 1 | 0 | "1000" × EXR1 |
| x | 1 | 0 | 0 | ("1000" – ("0" & YR decimal part)) × EX2 |
| 1 | 0 | 1 | 0 | ("1000" – ("0" & YS decimal part)) × EXR1 |
| 0 | 0 | 0 | 0 | "1000" × EX2 |

Referring to Table 2, "("1000"–("0" & YR decimal part))×EX2" indicates that "0" is added to the head of the three bits of the decimal part of YR to extend the decimal part to four bits, and the difference between "1000" and the 4-bit value is multiplied by EX2.

The output from the span change amount generating circuit 41 is shifted to the right by three bits by a shifter 42. This shifting operation result is then input to an arithmetic unit 43. Note that this shifting operation can be implemented by interchanging the connections for the respective bits of the output of the span change amount generating circuit 41.

An AND circuit 44 calculates the AND between the signal Y_YM_E and the output from an inverter 45 that has logically inverted the signal LRF, and inputs the AND to the arithmetic unit 43.

The operation of the arithmetic unit 43 will be described next with reference to FIGS. 9A to 9H. First of all, when YD=integral part of YS, the end point of a first span $P_0$ is the vertex S. The arithmetic unit 43 therefore outputs the X-coordinate X0 of the vertex S as the X-coordinate XB of the end point of the span when YD=integral part of YS. The arithmetic unit 43 keeps outputting the X-coordinate XB of this end point until the processing for the span $P_0$ is complete.

Assume that the triangle has a shape like the one shown in FIG. 9A with LRF="0" and Y_YS_E, Y_YM_E, and Y_YM_S are respectively "1", "0", and "1", i.e., the vertex S is present between the current span $P_0$ and a next span $P_1$. In this case, as is apparent from the outputs from the span change amount generating circuit 41 and the shifter 42, the change amount between an X-coordinate $XB_0$ of the end point of the span $P_0$ and an X-coordinate $XB_1$ of the end point of the span $P_1$ to be processed next is EXR1×(1–YS decimal part).

When the signal XEND (to be described later) is input, therefore, the arithmetic unit 43 adds EXR1×(1–YS decimal part) to the X-coordinate XB (i.e., X0) of the end point of the current span, and outputs the sum as the X-coordinate XB of the end point of the new span when the processing for the next span $P_1$ starts. The arithmetic unit 43 keeps outputting the X-coordinate XB of this end point until the processing for the span $P_1$ is complete.

Similarly, assume that the triangle has a shape like the one shown in FIG. 9B with LRF="1", and Y_YS_E is "1", i.e., the vertex S is present between the current span $P_0$ and a next span $P_1$. In this case, the change amount between the X-coordinate $XB_0$ of the end point of the span $P_0$ and the X-coordinate $XB_1$ of the end point of the span $P_1$ to be processed next is EXR1×(1–YS decimal part).

Upon reception of the signal XEND, therefore, the arithmetic unit 43 adds EXR1×(1–YS decimal part) to the X-coordinate XB (X0) of the end point of the current span, and outputs the sum as the X-coordinate XB of the end point of the new span when the processing for the next span $P_1$ starts.

Assume that Y_YS_E is set to "0" with respect to the triangle with LRF="1", i.e., the current span $P_n$ and the next span $P_{n+1}$ are located at the positions in FIGS. 9D, 9E, or 9F with respect to the triangle. In this case, as is apparent from the outputs from the span change amount generating circuit 41 and the shifter 42, the change amount between an X-coordinate $XB_n$ of the end point of the span $P_n$ and an X-coordinate $XB_{n+1}$ of the end point of the span $P_{n+1}$ to be processed next is EXR1.

Upon reception of the signal XEND, therefore, the arithmetic unit 43 adds EXR1 to the X-coordinate XB of the end point of the current span, and outputs the sum as the X-coordinate XB of the end point of the new span when the processing for the next span $P_{n+1}$ starts.

Similarly, assume that Y_YS_E, Y_YM_E, and Y_YM_S are respectively set to "0", "0", and "1" with respect to the triangle with LRF="0", i.e., the current span $P_n$ and the next span $P_{n+1}$ are located at the positions in FIG. 9C with respect to the triangle. In this case, the change amount between the X-coordinate $XB_n$ of the end point of the span $P_n$ and the X-coordinate $XB_{n+1}$ of the end point of the span $P_{n+1}$ to be processed next is EXR1.

Upon reception of the signal XEND, therefore, the arithmetic unit 43 adds EXR1 to the X-coordinate XB of the end point of the current span, and outputs the sum as the X-coordinate XB of the end point of the new span when the processing for the next span $P_{n+1}$ starts.

Figure 9G:
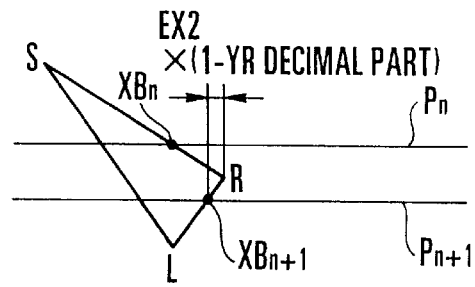

Assume that the triangle has a shape like the one shown in FIG. 9G with LRF="0", and Y_YM_E and Y_YM_S are respectively set to "1" and "0", i.e., the vertex R having the Y-coordinate YM is present between the current span $P_n$ and the next span $P_{n+1}$. In this case, the change amount between the X-coordinate XR of the vertex R and the X-coordinate $XB_{n+1}$ of the end point of the next span $P_{n+1}$ is EX2×(1–YR decimal part).

Upon reception of the signal XEND, therefore, the arithmetic unit 43 adds EX2×(1–YR decimal part) to the X-coordinate XR of the vertex R, and outputs the sum as the X-coordinate XB of the end point of the new span when the processing for the next span $P_{n+1}$ starts.

Figure 9H:
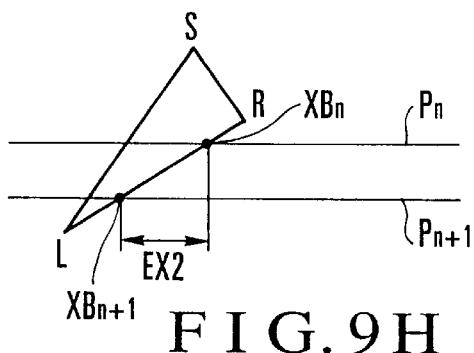

Assume that Y_YS_E, Y_YM_E, and Y_YM_S are respectively set to "0", "0", and "0" with respect to the triangle with LRF="0", i.e., the current span $P_n$ and the next span $P_{n+1}$ are located at the positions in FIG. 9H with respect to the triangle. In this case, the change amount between the X-coordinate $XB_n$ of the end point of the span $P_n$ and the X-coordinate $XB_{n+1}$ of the end point of the next span $P_{n+1}$ is EX2.

Upon reception of the signal XEND, therefore, the arithmetic unit 43 adds EX2 to the X-coordinate XB of the end point of the current span, and outputs the sum as the X-coordinate XB of the end point of the new span when the processing for the next span $P_{n+1}$ starts.

In either case, the arithmetic unit 43 keeps outputting the same value until the processing for the current span is complete.

A sub-span selection control circuit 4 outputs selection signals SEL0 to SEL7 for controlling the span start point generating circuit 2 and the span end point generating circuit 3, and also outputs signals UPE and DWE for controlling a valid sub-span designating circuit.

In this case, as shown in FIG. 7, sub-spans are line segments which run parallel to the X-axis and divide the region between the span $P_n$ and the span $P_{n+1}$, and the number of sub-spans is $2^m$ (m is a natural number equal to or larger than 1) per span. In this embodiment, the number of sub-spans between spans is set to eight. Note that one of the sub-spans between spans coincides with the span $P_n$.

The selection signals SEL0 to SEL7 respectively correspond to X-coordinates XS0 to XS7 of the start points of sub-spans and X-coordinates XE0 to XE7 of the end points of the sub-span (which will be described later). When this selection signal is "1", it indicates that the start and end points of the corresponding sub-span are the start and end points of a sub-span whose Y-coordinate is smaller than YM. When the selection signal is "0", it indicates that the start and end points of the corresponding sub-span are the start and end points of a sub-span whose Y-coordinate is equal to or larger than YM.

The signal UPE indicates the number of sub-spans having Y-coordinates smaller than YM, of the sub-spans crossing the triangle, in the interval between the span $P_n$ currently processed and the next span $P_{n+1}$.

The signal DWE indicates the number of sub-spans having Y-coordinates equal to or larger than YM, of the sub-spans crossing the triangle, in the interval between the current span $P_n$ and the next span $P_{n+1}$.

Figure 11:
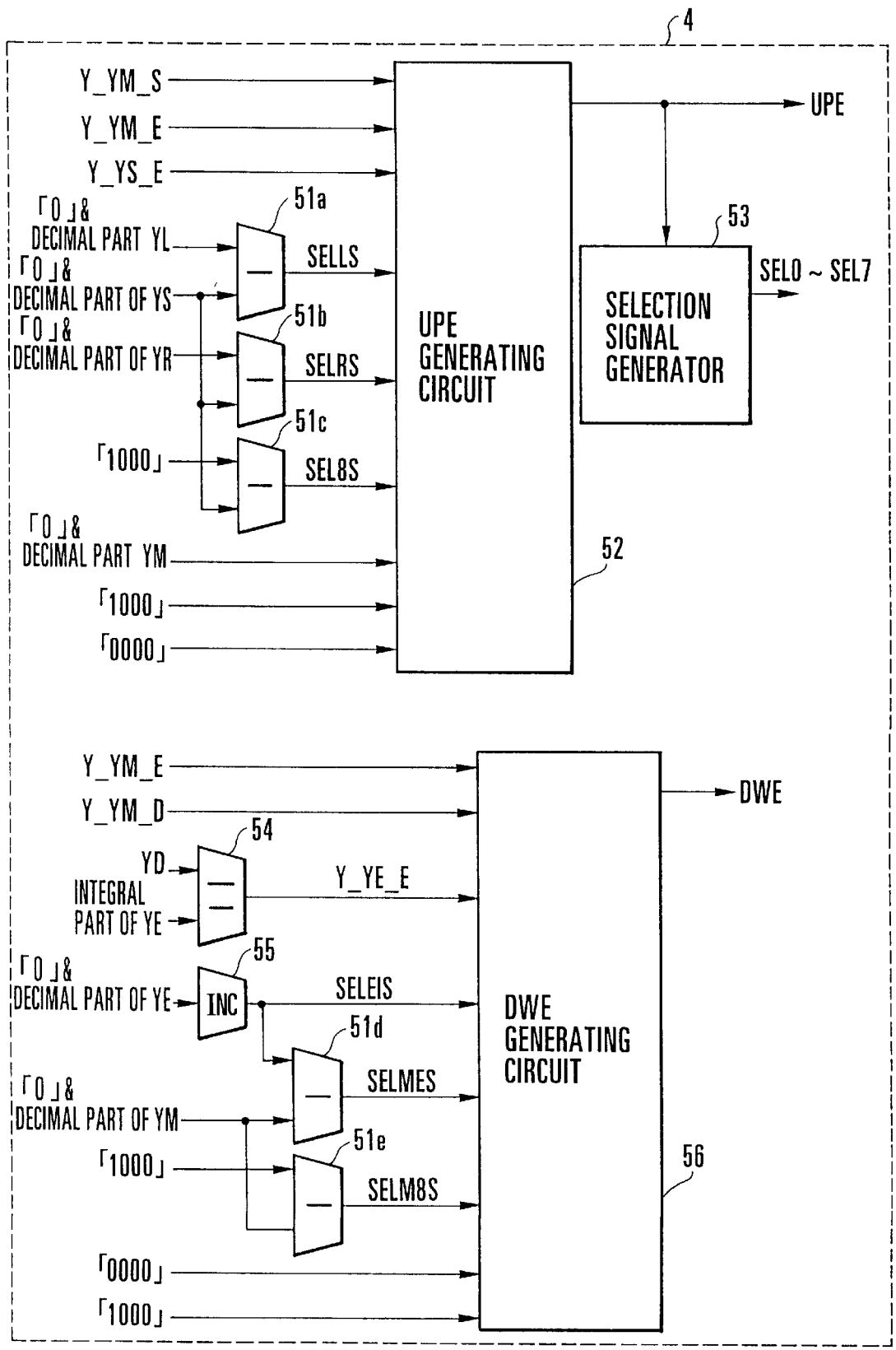
FIG. 11 is a block diagram showing a sub-span selection control circuit.
Figure 12A:
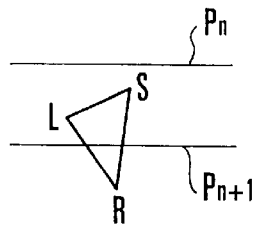
FIGS. 12A to 12N are views for explaining the operation of the sub-span selection control circuit.

FIG. 11 shows the sub-span selection control circuit 4. A subtracter 51a subtracts the 4-bit value obtained by adding "0" to the three bits of the decimal part of YS from the 4-bit value obtained by adding "0" to the three bits of the decimal part of YL, and outputs the 4-bit difference as SELLS. This value SELLS indicates the number of sub-spans between the vertexes S and L (excluding the vertex L) in the triangle in FIG. 12A when the vertexes S and L are present between the current span $P_n$ and the next span $P_{n+1}$.

Figure 12B:
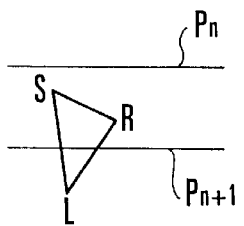

A subtracter 51b subtracts the 4-bit value obtained by adding "0" to the three bits of the decimal part of YS from the 4-bit value obtained by adding "0" to the three bits of the decimal part of YR, and outputs the 4-bit difference as SELRS. This value SELRS indicates the number of sub-spans between the vertexes S and R (excluding the vertex R) in the triangle in FIG. 12B when the vertexes S and R are present between the current span $P_n$ and the next span $P_{n+1}$.

Figure 12C:
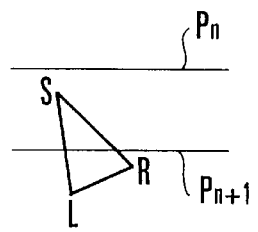
Figure 12D:
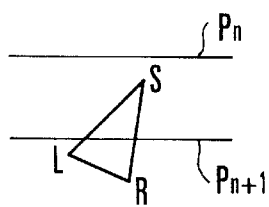

A subtracter 51c subtracts the 4-bit value obtained by adding "0" to the three bits of the decimal part of YS from the 4-bit value "1000", and outputs the 4-bit difference as SEL8S. This value SEL8S indicates the number of sub-spans between the vertex S and the next span $P_{n+1}$ (excluding the span $P_{n+1}$) in the triangle in FIGS. 12C or 12D when the vertex S is present between the current span $P_n$ and the next span $P_{n+1}$.

A UPE generating circuit 52 selects SELLS, SELRS, SEL8S, "1000", "0000", or the 4-bit value obtained by adding "0" to the head of the three bits of the decimal part of YM in accordance with the signals Y_YM_S, Y_YM_E, Y_YS_E,, and LRF output from the rendering Y-coordinate generating circuit 1, and outputs it as the output signal UPE. Table 3 shows the selecting operation of the UPE generating circuit 52. In table 3, "x" indicates that either "0" or "1" can be set.

TABLE 3

Operation of UPE Generating Circuit 52

| Y_YS_E | Y_YM_E | Y_YM_S | LRF | UPE |
|---|---|---|---|---|
| 1 | 1 | x | 1 | SELLS |
| 1 | 1 | x | 0 | SELRS |
| 1 | 0 | x | x | SEL8S |
| 0 | 0 | 1 | x | 1000 |
| 0 | 0 | 0 | x | 0000 |
| 0 | 1 | x | x | "0" & YM decimal part |

When Y_YS_E, Y_YM_E, and LRF are "1" (in the case shown in FIG. 12A), the UPE generating circuit 52 selects SELLS and outputs it as UPE.

When Y_YS_E and Y_YM_E are "1" and LRF is "0" (in the case shown in FIG. 12B), the UPE generating circuit 52 selects SELRS and outputs it as UPE.

When Y_YS_E is "1" and Y_YM_E is "0" (in the case shown in FIGS. 12C or 12D), the UPE generating circuit 52 selects SEL8S and outputs it as UPE.

Figure 12E:
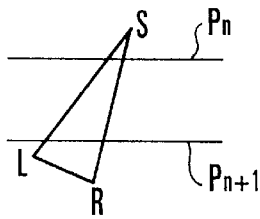
Figure 12F:
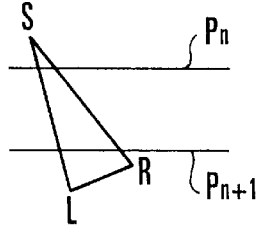

When Y_YS_E and Y_YM_E are "0" and Y_YM_S is "1" (in the case shown in FIGS. 12E or 12F), the UPE generating circuit 52 selects "1000" and outputs it as UPE. This signal indicates that the number of sub-spans between spans crossing the sides of the triangle is eight.

Figure 12G:
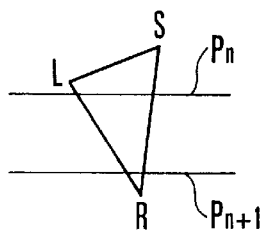
Figure 12H:
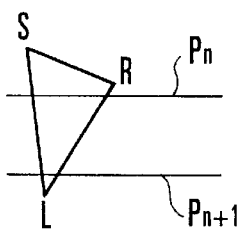

When Y_YS_E, Y_YM_E, and Y_YM_S are "0" (in the case shown in FIGS. 12G or 12H), the UPE generating circuit 52 selects "0000" and outputs it as UPE. This signal indicates that the number of sub-spans is 0. The reason why the lumber of sub-spans is 0 in spite of the presence of sub-spans crossing the triangle between the span $P_n$ and the span $P_{n+1}$ is that the UPE generating circuit 52 processes only sub-spans whose Y-coordinates are smaller than YM.

Figure 12I:
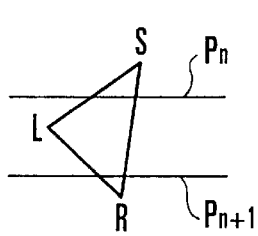
Figure 12J:
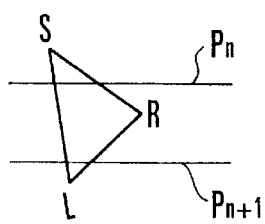

When Y_YS_E is "0" and Y_YM_E is "1" (in the case shown in FIGS. 12I or 12J), the UPE generating circuit 52 selects the 4-bit value obtained by adding "0" to the head of the three bits of the decimal part of YM, and outputs it as UPE. This 4-bit value obtained by adding "0" to the three bits of the decimal part of YM indicates the number of sub-spans between the span $P_n$ and the vertex L or R (excluding the vertex L or R) in the triangle shown in FIGS. 12I or 12J when only the vertex L or R having the Y-coordinate YM is present between the span $P_n$ and the next span $P_{n+1}$.

A selection signal generator 53 outputs selection signals SEL0 to SEL7 in accordance with the output signal UPE from the UPE generating circuit 52. Table 4 shows the operation of the selection signal generator 53.

TABLE 4

Operation of Selection Signal Generator 53

| UPE | SEL0 | SEL1 | SEL2 | SEL3 | SEL4 | SEL5 | SEL6 | SEL7 |
|---|---|---|---|---|---|---|---|---|
| 0000 | 0 | 0 | 0 | 0 | 0 | 0 | 0 | 0 |
| 0001 | 1 | 0 | 0 | 0 | 0 | 0 | 0 | 0 |
| 0010 | 1 | 1 | 0 | 0 | 0 | 0 | 0 | 0 |
| 0011 | 1 | 1 | 1 | 0 | 0 | 0 | 0 | 0 |
| 0100 | 1 | 1 | 1 | 1 | 0 | 0 | 0 | 0 |
| 0101 | 1 | 1 | 1 | 1 | 1 | 0 | 0 | 0 |
| 0110 | 1 | 1 | 1 | 1 | 1 | 1 | 0 | 0 |
| 0111 | 1 | 1 | 1 | 1 | 1 | 1 | 1 | 0 |
| 1000 | 1 | 1 | 1 | 1 | 1 | 1 | 1 | 1 |

For example, the selection signal generator 53 sets all the output signals SEL0 to SEL7 to "0" when UPE is "0000", and sets all the output signals SEL0 to SEL7 to "1" when UPE is "1000".

A comparator 54 compares the Y-coordinate YD (the Y-coordinate of the span currently processed) of each pixel output from the rendering Y-coordinate generating circuit 1 with the integral part of YE. If YD is equal to the integral part of YE, the comparator 54 sets an output Y_YE_E to "1". Otherwise, the comparator 54 sets the output Y_YE_E to "0".

Figure 12K:
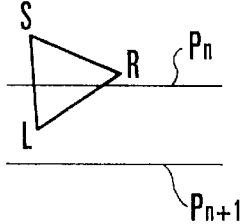
Figure 12L:
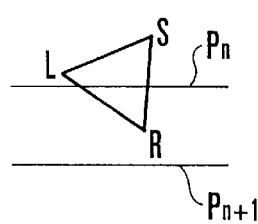

An adder 55 adds "0001" to the 4-bit value obtained by adding "0" to the head of the three bits of the decimal part of YE, and outputs the 4-bit sum as SELEIS. This value SELEIS indicates the number of sub-spans between the vertex L or R and the span $P_n$ (including the vertex) in the triangle shown in FIGS. 12K or 12L when the vertex L or R having the maximum Y-coordinate is present between the span $P_n$ and the next span $P_{n+1}$.

Figure 12M:
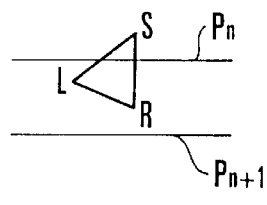
Figure 12N:
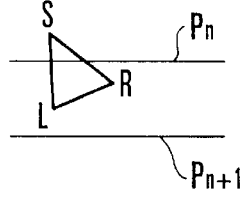

A subtracter 51d subtracts the 4-bit value obtained by adding "0" to the head of the three bits of the decimal part of YM from the output SELEIS from the adder 55, and outputs the 4-bit difference as SELMES. This value SELMES indicates the number of sub-spans between the vertexes L and R (including one of the vertexes) in the triangle shown in FIGS. 12M or 12N when the vertexes L and R are present between the span $P_n$ and the next span $P_{n+1}$.

A subtracter 51e subtracts the 4-bit value obtained by adding "0" to the head of the three bits of the decimal part of YM from the 4-bit value "1000", and outputs the 4-bit difference as SELM8S. This value SELM8S indicates the number of sub-spans between the vertex L or R and the next span $P_{n+1}$ (excluding the span $P_{n+1}$) in the triangle shown in FIGS. 12I or 12J when only the vertex L or R is present between the span $P_n$ and the next span $P_{n+1}$.

A DWE generating circuit 56 selects SELEIS, SELMES, SELM8S, "1000", or "0000" in accordance with the signals Y_YM_E and Y_YM_D output from the rendering Y-coordinate generating circuit 1 and the signal Y_YE_E output from the comparator 54, and outputs it as the output signal DWE. Table 5 shows the selecting operation of the UPE generating circuit 52. In table 5, "x" indicates that either "0" or "1" can be set.

TABLE 5

Operation of DWE Generating Circuit 56

| Y_YM_E | Y_YE_E | Y_YM_D | DWE |
|--------|--------|--------|--------|
| 1 | 1 | x | SELMES |
| 1 | 0 | x | SELM8S |
| 0 | 0 | 0 | 0000 |
| 0 | 0 | 1 | 1000 |
| 0 | 1 | x | SELEIS |

When Y_YM_E and Y_YE_E are "1" (in the case shown in FIGS. 12M or 12N), the DWE generating circuit 56 selects SELMES and outputs it as DWE.

When Y_YM_E is "1" and Y_YE_E is "0" (in the case shown in FIGS. 12I or 12J), the DWE generating circuit 56 selects SELM8S and outputs it as DWE.

When Y_YM_E, Y_YE_E, and Y_YM_D are "0" (in the case shown in FIGS. 12C, 12D, 12E, or 12F), the DWE generating circuit 56 selects "0000" and outputs it as DWE. This signal indicates that the number of sub-spans is 0. The reason why the number of sub-spans is 0 in spite of the presence of sub-spans crossing the triangle between the span $P_n$ and the span $P_{n+1}$ is that the DWE generating circuit 56 handles only sub-spans whose Y-coordinates are equal to or larger than YM.

When Y_YM_E and Y_YE_E are "0" and Y_YM_D is "1" (in the case shown in FIGS. 12G or 12H), the DWE generating circuit 56 selects "1000" and outputs it as DWE. This signal indicates that the number of sub-spans between spans crossing the sides of the triangle is eight.

When Y_YM_E is "0" and Y_YE_E is "1" (in the case shown in FIGS. 12K or 12L), the DWE generating circuit 56 selects SELEIS and outputs it as DWE.

A sub-span change amount generating circuit 5 generates change amounts EXL1_1S to EXL1_7S and EXL1S to EXL7S between the X-coordinate of a reference point (to be described later) and the X-coordinates of a plurality of sub-span start points on the side SL or LR, and also generates change amounts EXR1_1S to EXR1_7S and EXT1S to EXR7S between the X-coordinate of the reference point and the X-coordinates of a plurality of sub-span end points on the side SR or LR (step 203). These change amounts are real numbers, and are expressed as binary values each consisting of several ten bits.

Figure 13:
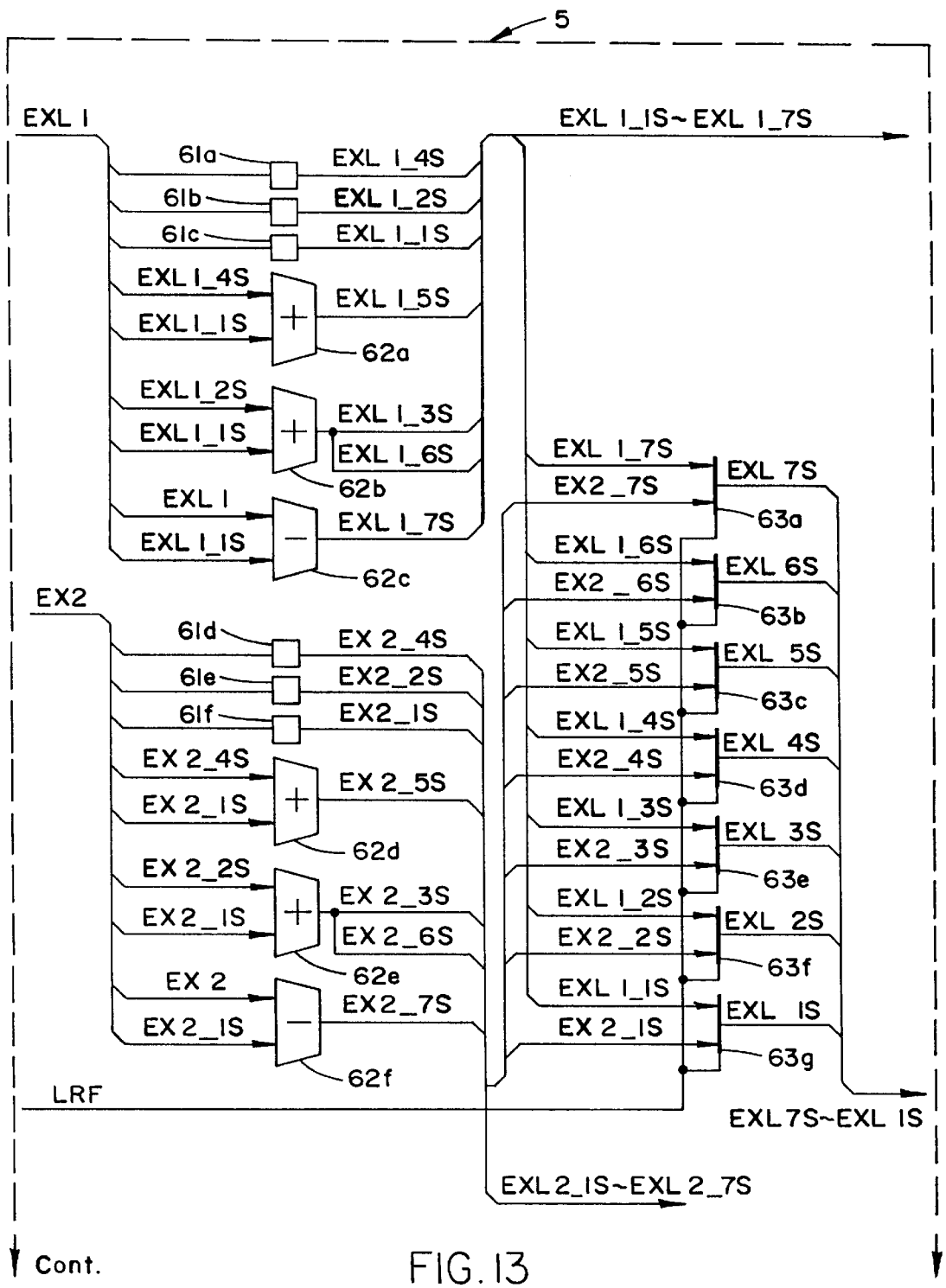
FIG. 13 is a block diagram showing a sub-span change amount generating circuit.
Figure 14:
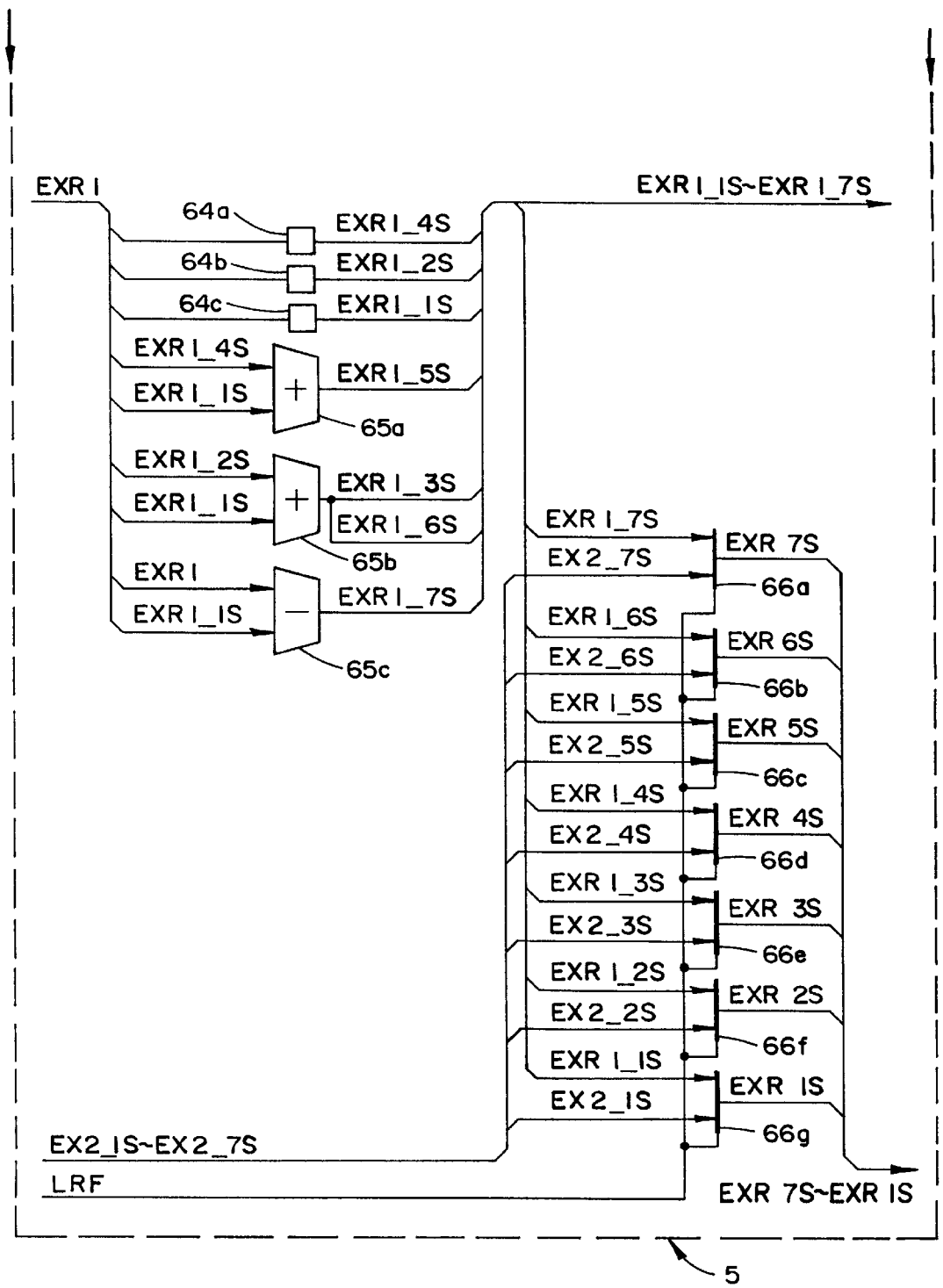
FIG. 14 is a block diagram showing the sub-span change amount generating circuit.

FIGS. 13 and 14 show the sub-span change amount generating circuit 5. First of all, a shifter 61a shifts the value of the slope EXL1 of the side SL to the right by one bit, and outputs the shifting operation result as EXL1_4. This value EXL1_4 corresponds to ⁴⁄₈ of EXL1.

A shifter 61b shifts the value of the slope EXL1 to the right by two bits, and outputs the shifting operation result as EXL1_2S. This value EXL1_2S corresponds to ²⁄₈ of EXL1.

A shifter 61c shifts the value of the slope EXL1 to the right by three bits, and outputs the shifting operation result as EXL1_1S. This value corresponds to ⅛ of EXL1.

Note that the above shifting operation can be implemented by interchanging the connections for the respective bits of EXL1.

An adder 62a adds EXL1_4S and EXL1_1S, and outputs the sum as EXL1_5S. This value EXL1_5S corresponds to ⅝ of EXL1.

An adder 62b adds EXL1_2S and EXL1_1S, and outputs the sum as EXL1_3S. This value EXL1_3S corresponds to ⅜ of EXL1.

In addition, EXL1_3S is shifted to the left by one bit by a shifter (not shown), and the shifting operation result is output as EXL1_6S. This shifting operation can be implemented by interchanging the connections for the respective bits of EXL1_3S. EXL1_6S corresponds to ⁶⁄₈ of EXL1.

An adder 62c adds EXL1 and EXL1_1S, and outputs the sum as EXL1₁₃7S. This value EXL1_7 corresponds to ⅞ of EXL1.

A shifter 61d shifts the value of the slope EX2 of the side LR to the right by one bit, and outputs the shifting operation result as EX2_4S. This value EX2_4S corresponds to ⁴⁄₈ of EX2.

A shifter 61e shifts the value of the slope EX2 to the right by two bits, and outputs the shifting operation result as EX2_2S. This value EX2_2S corresponds to ²⁄₈ of EX2.

A shifter 61f shifts the value of the slope EX2 to the right by three bits, and outputs the shifting operation result as EX2_1S. This value EX2_1S corresponds to ⅛ of EX2. The above shifting operation can be implemented by interchanging the connections for the respective bits of EX2.

Subsequently, an adder 62d adds EX2_4S and EX2_1S, and outputs the sum as EX2_5S. This value EX2_5S corresponds to ⅝ of EX2.

An adder 62e adds EX2__2S and EX2__1S, and outputs the sum as EX2__3S. This value EX2__3S corresponds to ⅜ of EX2.

In addition, EX2__3S is shifted to the left by one bit by a shifter (not shown), and the shifting operation result is output as EX2__6S. This shifting operation can be implemented by interchanging the connections for the respective bits of EX2__3S. EX2__6S corresponds to 6/8 of EX2.

An adder 62f adds EX2 and EX2__1S, and outputs the sum as EX2__7S. This value EX2__7S corresponds to ⅞ of EX2.

A selector 63a selects EXL1__7S when the signal LRF output from the rendering Y-coordinate generating circuit 1 is "0", and EX2__7S when the signal LRF is "1". The selector 63a then outputs the selection result as EXL7S.

A selector 63b selects EXL1__6S when the signal LRF output is "0", and EX2__6S when the signal LRF is "1". The selector 63b then outputs the selection result as EXL6S.

A selector 63c selects EXL1__5S when the signal LRF output is "0", and EX2__5S when the signal LRF is "1". The selector 63c then outputs the selection result as EXL5S.

A selector 63d selects EXL1__4S when the signal LRF output is "0", and EX2__4S when the signal LRF is "1". The selector 63d then outputs the selection result as EXL4S.

A selector 63e selects EXL1__3S when the signal LRF output is "0", and EX2__3S when the signal LRF is "1". The selector 63e then outputs the selection result as EXL3S.

A selector 63f selects EXL1__2S when the signal LRF output is "0", and EX2__2S when the signal LRF is "1". The selector 63f then outputs the selection result as EXL2S.

A selector 63g selects EXL1__1S when the signal LRF output is "0", and EX2__1S when the signal LRF is "1". The selector 63g then outputs the selection result as EXL1S.

The above change amounts are used to calculate the X-coordinates of the respective sub-span start points. The change amounts EXL1__1S to EXL1__7S are used for the sub-spans having Y-coordinates smaller than YM. EXL7S to EXL1S are used for the sub-spans having Y-coordinates equal to or larger than YM.

A shifter 64a shifts the value of the slope EXR1 of the side SR to the right by one bit, and outputs the shifting operation result as EXR1__4S. This value EXR1__4S corresponds to ⅘ of EXR1.

A shifter 64b shifts the value of the slope EXR1 to the right by two bits, and outputs the shifting operation result as EXR1__2S. This value EXR1__2S corresponds to ⅖ of EXR1.

A shifter 64c shifts the value of the slope EXR1 to the right by three bits, and outputs the shifting operation result as EXR1__1S. This value EXR1__1S corresponds to ⅛ of EXTR1. Note that the above shifting operation can be implemented by interchanging the connections for the respective bits of EXR1.

An adder 65a adds EXR1__4S and EXR1__1S, and outputs the sum as EXT1__5S. This value EXR1__5S corresponds to ⅝ of EXR1.

An adder 65b adds EXR1__2S and EXR1__1S, and outputs the sum as EXR1__3S. This value EXR1__3S corresponds to ⅜ of EXR1.

In addition, EXR1__3S is shifted to the left by one bit by a shifter (not shown), and the shifting operation result is output as EXT1__6S. This shifting operation can be implemented by interchanging the connections for the respective bits of EXR1__3S. EXR1__6S corresponds to 6/8 of EXR1.

An adder 65c adds EXR1 and EXR1__1S, and outputs the sum as EXR1__7S. This value EXR1__7S corresponds to ⅞ of EXR1.

Subsequently, a selector 66a selects EXR1__7S when the signal LRF is "1", and EX2__7S when the signal LRF is "0". The selector 66a outputs this selection result as EXR7S.

A selector 66b selects EXR1__6S when the signal LRF is "1", and EX2__6S when the signal LRF is "0". The selector 66b outputs this selection result as EXR6S.

A selector 66c selects EXR1__5S when the signal LRF is "1", and EX2__5S when the signal LRF is "0". The selector 66c outputs this selection result as EXR5S.

A selector 66d selects EXR1__4S when the signal LRF is "1", and EX2__4S when the signal LRF is "0". The selector 66d outputs this selection result as EXR4S.

A selector 66e selects EXR1 __3S when the signal LRF is "1", and EX2__3S when the signal LRF is "0". The selector 66e outputs this selection result as EXR3S.

A selector 66f selects EXR1__2S when the signal LRF is "1", and EX2__2S when the signal LRF is "0". The selector 66f outputs this selection result as EXR2S.

A selector 66g selects EXR1__1S when the signal LRF is "1", and EX2__1S when the signal LRF is "0". The selector 66g outputs this selection result as EXR1S.

The above change amounts are used to calculate the X-coordinates of the respective sub-span end points. The change amounts EXR1__1S to EXR1__7S are used for the sub-spans having Y-coordinates smaller than YM. EXR7S to EXR1S are used for the sub-spans having Y-coordinates equal to or larger than YM.

A sub-span start point generating circuit 6 obtains intersections having the minimum X-coordinates, of the intersections of the sides of the triangle and a plurality of sub-spans that divide the region between the span $P_n$ which is currently processed and corresponds to the Y-coordinate YD and the span $P_{n+1}$ which is to be processed next and corresponds to the Y-coordinate YD+1, in units of sub-spans, sets these intersections as the start points of the respective sub-spans, and outputs X-coordinates XS0 to XS7 of the respective start points (step 204 in FIG. 4).

For example, in the case of the triangle shown in FIG. 7, the start points of sub-spans $SP_0$ to $SP_7$ are the positions of XS0 to XS7. Note that one of these sub-spans coincides with the span $P_n$ currently processed. The X-coordinates XS0 to XS7 of the start points of the sub-spans are real numbers, which are expressed as binary values each consisting of several ten bits.

Figure 15:
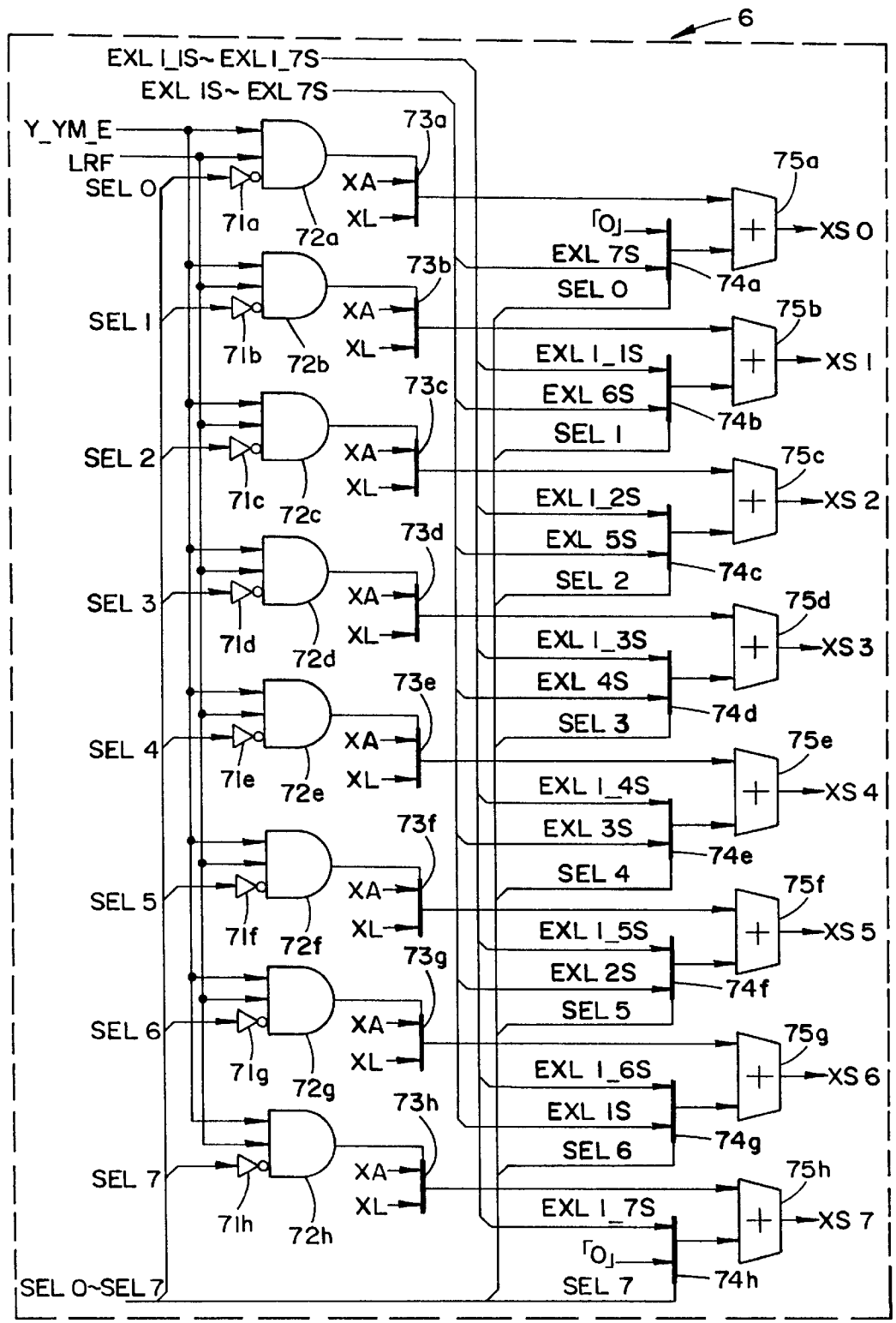
FIG. 15 is a block diagram showing a sub-span start point generating circuit.

FIG. 15 shows the sub-span start point generating circuit 6. An AND circuit 72a calculates the AND between the output from an inverter 71a for logically inverting the signal SEL0, the signal Y__YM__E, and the signal LRF. A selector 73a selects and outputs the X-coordinate XA of the span start point output from the span start point generating circuit 2 when the output from the AND circuit 72a is "0", and the X-coordinate XL of the vertex L when the output from the AND circuit 72a is "1".

An AND circuit 72b calculates the AND between the output from an inverter 71b for logically inverting the signal SEL1, the signal Y__YM__E, and the signal LRF. A selector 73b selects and outputs XA when the output from the AND circuit 72b is "0", and XL when the output from the AND circuit 72b is "1".

An AND circuit 72c calculates the AND between the output from an inverter 71c for logically inverting the signal SEL2, the signal Y__YM__E, and the signal LRF. A selector 73c selects and outputs XA when the output from the AND circuit 72c is "0", and XL when the output from the AND circuit 72c is "1".

An AND circuit 72d calculates the AND between the output from an inverter 71d for logically inverting the signal SEL3, the signal Y__YM__E, and the signal LRF. A selector 73d selects and outputs XA when the output from the AND circuit 72d is "0", and XL when the output from the AND circuit 72d is "1".

An AND circuit 72e calculates the AND between the output from an inverter 71e for logically inverting the signal SEL4, the signal Y__YM__E, and the signal LRF. A selector 73e selects and outputs XA when the output from the AND circuit 72e is "0", and XL when the output from the AND circuit 72e is "1".

An AND circuit 72f calculates the AND between the output from an inverter 71f for logically inverting the signal SEL5, the signal Y__YM__E, and the signal LRF. A selector 73f selects and outputs XA when the output from the AND circuit 72f is "0", and XL when the output from the AND circuit 72f is "1".

An AND circuit 72g calculates the AND between the output from an inverter 71g for logically inverting the signal SEL6, the signal Y__YM__E, and the signal LRF. A selector 73g selects and outputs XA when the output from the AND circuit 72g is "0", and XL when the output from the AND circuit 72g is "1".

An AND circuit 72h calculates the AND between the output from an inverter 71h for logically inverting the signal SEL7, the signal Y__YM__E, and the signal LRF. A selector 73h selects and outputs XA when the output from the AND circuit 72h is "0", and XL when the output from the AND circuit 72h is "1".

When LRF is "0", i.e., YL≧YR, each of the first selectors 73a to 73h selects a span start point as a reference point that is used as a reference to obtain each sub-span start point, and outputs the X-coordinate XA of the span :start point.

When LRF is "1", i.e., YL<YR and Y__YM__E ="0", that is, when the vertex L having the coordinate YM is not present between spans, each first selector selects a span start point as a reference point, and outputs the X-coordinate XA of the span start point. When LRF is "1" and Y__YM__E is "1", i.e., the vertex L having the coordinate YM is present between spans, each selector selects a span start point as a reference point for sub-spans having Y-coordinates smaller than YM (the corresponding selection SEL is "1"), and outputs the X-coordinate XA of the span start point. For sub-spans having the Y-coordinates equal to or larger than YM (the selection signal is "0"), each selector selects the vertex L as a reference point, and outputs the X-coordinate XL of the vertex L.

A selector 74a selects and outputs "0" (in practice, a value having the same number of bits as that of EXL7S) when the signal SEL0 is "1", and EXL7S when the signal SEL0 is "0".

A selector 74b selects and outputs EXL1__1S when the signal SEL1 is "1", and EXL6S when the signal SEL1 is "0".

A selector 74c selects and outputs EXL1__2S when the signal SEL2 is "1", and EXL5S when the signal SEL2 is "0".

A selector 74d selects and outputs EXL1__3S when the signal SEL3 is "1", and EXL4S when the signal SEL3 is "0".

A selector 74e selects and outputs EXL1__4S when the signal SEL4 is "1", and EXL3S when the signal SEL4 is "0".

A selector 74f selects and outputs EXL1__5S when the signal SEL5 is "1", and EXL2S when the signal SEL5 is "0".

A selector 74g selects and outputs EXL1__6S when the signal SEL6 is "1", and EXL1S when the signal SEL6 is "0".

A selector 74h selects and outputs EXL__7S when the signal SEL7 is "1", and "0" (in practice, a value having the same number of bits as that of EXL1__7S) when the signal SEL7 is "0".

An adder 75a adds the output from the selector 74a to the output from the selector 73a, and outputs the sum as XS0.

An adder 75b adds the output from the selector 74b to the output from the selector 73b, and outputs the sum as XS1.

An adder 75c adds the output from the selector 74c to the output from the selector 73c, and outputs the sum as XS2.

An adder 75d adds the output from the selector 74d to the output from the selector 73d, and outputs the sum as XS3.

An adder 75e adds the output from the selector 74e to the output from the selector 73e, and outputs the sum as XS4.

An adder 75f adds the output from the selector 74f to the output from the selector 73f, and outputs the sum as XS5.

An adder 75g adds the output from the selector 74g to the output from the selector 73g, and outputs the sum as XS6.

An adder 75h adds the output from the selector 74h to the output from the selector 73h, and outputs the sum as XS7.

The X-coordinates of the start points of the respective sub-spans can be obtained by adding the change amounts output from the second selectors 74a to 74h to the X-coordinates of the reference points output from the first selectors 73a to 73h in this manner.

The above processes associated with XS0 to XS7 are concurrently executed to output XS0 to XS7 at once.

The above operation of the sub-span start point generating circuit 6 will be described next with reference to FIGS. 16A and 16B. When, for example, the current span $P_n$ and the next span $P_{n+1}$ are located at the positions in FIG. 16A with respect to the triangle (the vertexes L and R may not be present between the spans, while the vertex S may be present between the spans), all the selection signals SEL0 to SEL7 are "1".

The sub-span start point generating circuit 6 therefore respectively adds 0, EXL1__1S, EXL1__2S, EXL1__3S, EXL1__4S, EXL1__5S, EXL1__6S, and EXL1__7S to the X-coordinate XA of the start point of the span $P_n$, and sets the respective sums as the X-coordinates XS0 to XS7 of the start points of the sub-spans $SP_0$ to $SP_7$.

Figure 16A:
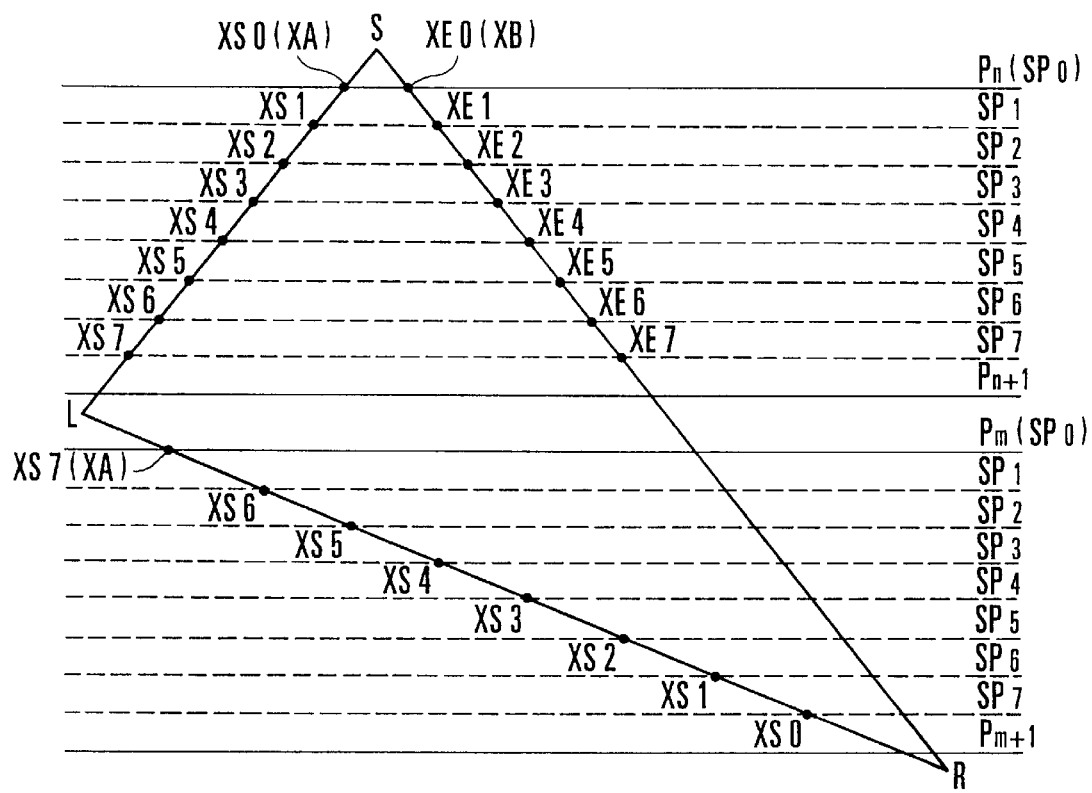
FIGS. 16A and 16B are views for explaining the operation of the sub-span start point generating circuit.

When a current span $P_m$ and the next span $P_{m+1}$ are located at the positions in FIG. 16A with respect to the triangle (the vertex having the Y-coordinate YM may not be present between the spans, while the vertex having the maximum Y-coordinate may be present between the spans), all the selection signals SEL0 to SEL7 are "0". The sub-span start point generating circuit 6 therefore respectively adds EXL7S, EXL6S, EXL5S, EXL4S, EXL3S, EXL2S, EXL1S, and 0 to the X-coordinate XA of the start point of the span $P_m$, and sets the respective sums as the X-coordinates XS0 to XS7 of the start points of the sub-spans SP7 to $SP_0$.

Figure 16B:
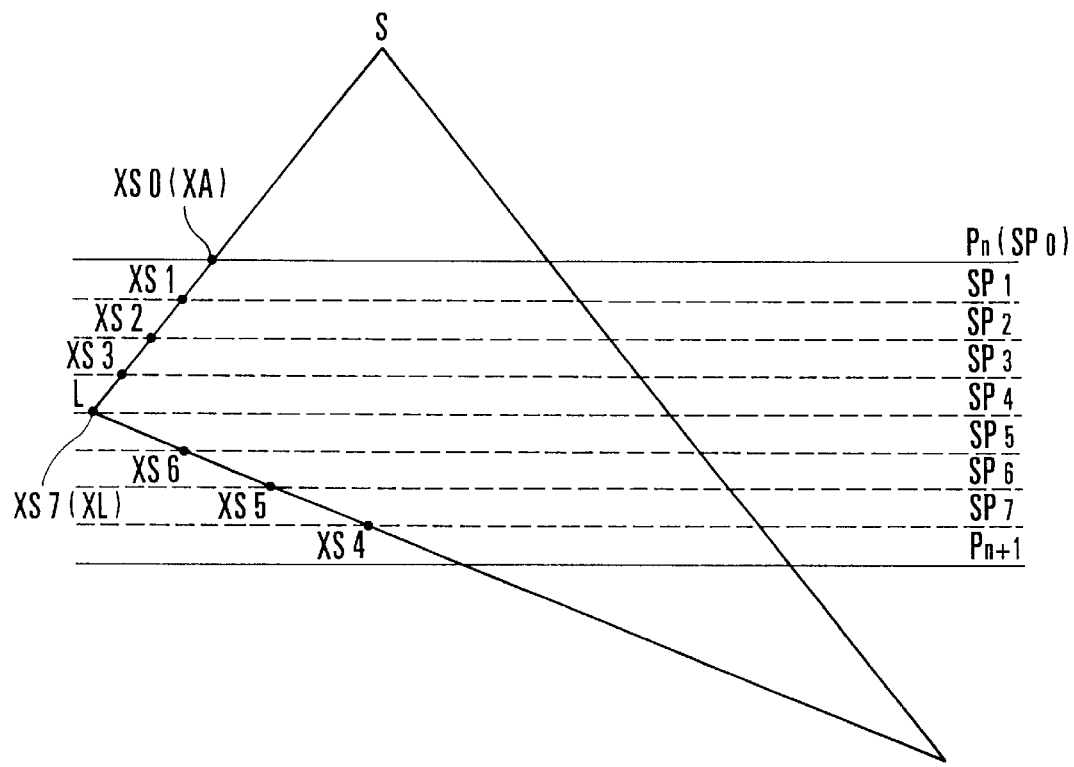

When the current span $P_n$ and the next span $P_{n+1}$ are located at the positions in FIG. 16B with respect to the triangle with LRF="1", the selection signals SEL0 to SEL3 become "1", and the selection signals SEL4 to SEL7 become "0".

The sub-span start point generating circuit 6 therefore respectively adds 0, EXL1__1S, EXL1__2S, and EXL1__3S to the X-coordinate XA of the start point of the span $P_n$, and sets the respective sums as the X-coordinates XS0 to XS3 of the start points of the respective sub-spans $SP_0$ to $SP_3$. The sub-span start point generating circuit 6 also respectively adds EXL3S, EXL2S, EXL1S, and 0 to the X-coordinate XL of the vertex L, and sets the respective sums as the X-coordinates XS4 to XS7 of the start points of the respective sub-spans SP$_4$ to SP$_7$.

A sub-span end point generating circuit 7 obtains intersections having the maximum X-coordinates, of the intersections of the sides of the triangle and a plurality of sub-spans that divide the region between the span P$_n$ which is currently processed and corresponds to the Y-coordinate YD and the span P$_{n+1}$ which is to be processed next and corresponds to the Y-coordinate YD+1, in units of sub-spans, sets these intersections as the end points of the respective sub-spans, and outputs X-coordinates XE0 to XE7 of the respective end points concurrently with the outputs from the sub-span start point generating circuit 6 (step 204).

For example, in the case of the triangle shown in FIG. 7, the end points of sub-spans SP$_0$ to SP$_7$ are the positions of XE0 to XE7. Note that one of these sub-spans coincides with the span P$_n$ currently processed. The X-coordinates XE0 to XE7 of the end points of the sub-spans are real numbers, which are expressed as binary values each consisting of several ten bits.

Figure 17:
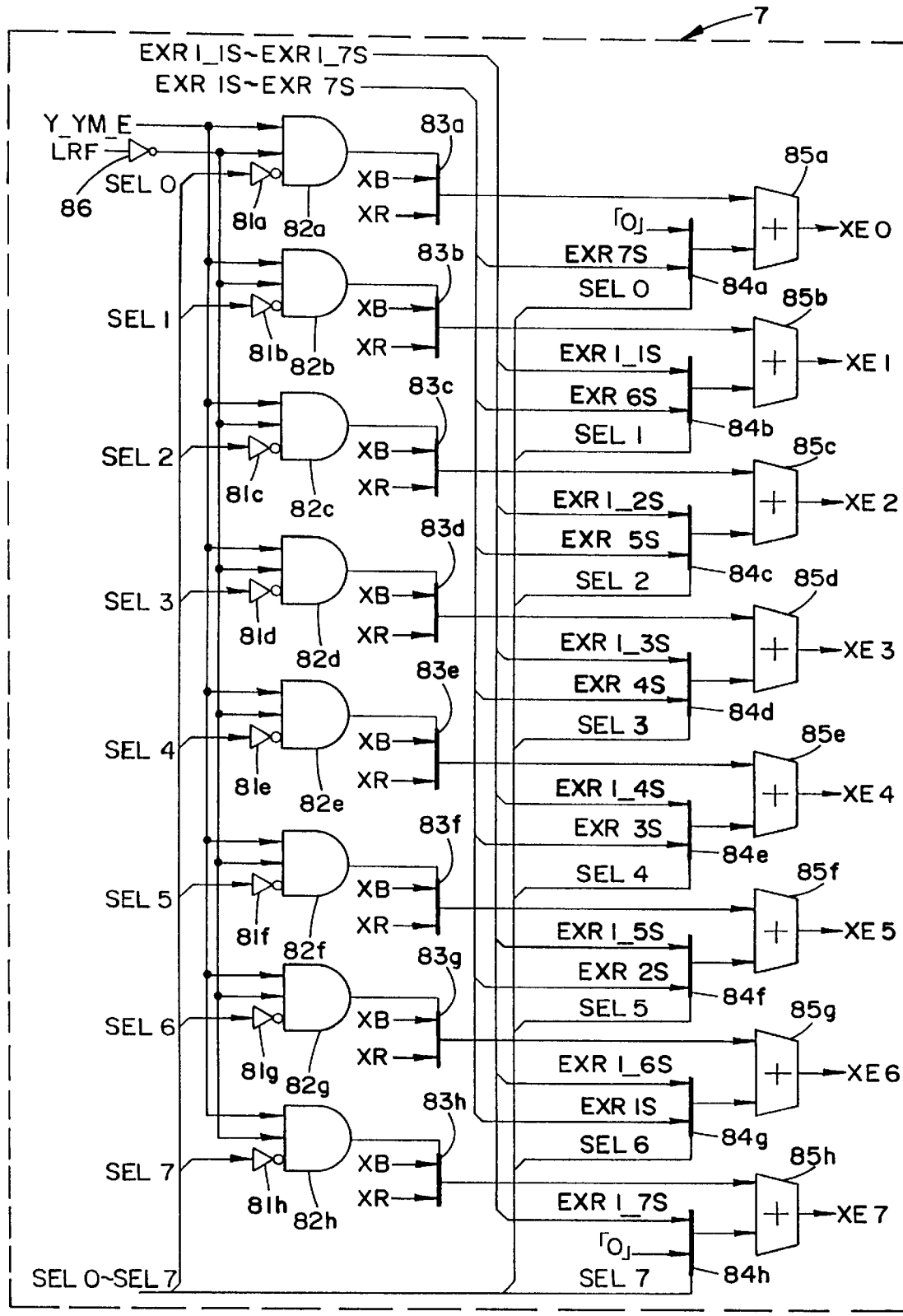
FIG. 17 is a block diagram showing a sub-span end point generating circuit.

FIG. 17 shows the sub-span end point generating circuit 7. An AND circuit 82a calculates the AND between the output from an inverter 81a for logically inverting the signal SEL0, the signal Y_YM_E, and the output from an inverter 86 for logically inverting the signal LRF. A selector 83a selects and outputs the X-coordinate XB of the span end point output from the span end point generating circuit 3 when the output from the AND circuit 82a is "0", and the X-coordinate XR of the vertex R when the output from the AND circuit 82a is "1".

An AND circuit 82b calculates the AND between the output from an inverter 81b for logically inverting the signal SEL1, the signal Y_YM_E, and the output from the inverter 86. A selector 83b selects and outputs XB when the output from the AND circuit 82b is "0", and XR when the output from the AND circuit 82b is "1".

An AND circuit 82c calculates the AND between the output from an inverter 81c for logically inverting the signal SEL2, the signal Y_YM_E, and the output from the inverter 86. A selector 83c selects and outputs XB when the output from the AND circuit 82c is "0", and XR when the output from the AND circuit 82c is "1".

An AND circuit 82d calculates the AND between the output front an inverter 81d for logically inverting the signal SEL3, the signal Y_YM_E, and the output from the inverter 86. A selector 83d selects and outputs XB when the output from the AND circuit 82d is "0", and XR when the output from the AND circuit 82d is "1".

An AND circuit 82e calculates the AND between the output from an inverter 81e for logically inverting the signal SEL4, the signal Y_YM_E, and the output from the inverter 86. A selector 83e selects and outputs XB when the output from the AND circuit 82e is "0", and XR when the output from the AND circuit 82e is "1".

An AND circuit 82f calculates the AND between the output from an inverter 81f for logically inverting the signal SEL5, the signal Y_YM_E, and the output from the inverter 86. A selector 83f selects and outputs XB when the output from the AND circuit 82f is "0", and XR when the output from the AND circuit 82f is "1".

An AND circuit 82g calculates the AND between the output from an inverter 81g for logically inverting the signal SEL6, the signal Y_YM_E, and the output from the inverter 86. A selector 83g selects and outputs XB when the output from the AND circuit 82g is "0", and XR when the output from the AND circuit 82g is "1".

An AND circuit 82h calculates the AND between the output from an inverter 81h for logically inverting the signal SEL7, the signal Y_YM_E, and the output from the inverter 86. A selector 83h selects and outputs XB when the output from the AND circuit 82h is "0", and XR when the output from the AND circuit 82h is "1".

When, therefore, LRF is "1", i.e., YL<YR, each of the third selectors 83a to 83h selects a span end point as a reference point used as a reference to obtain each sub-span end point, and outputs the X-coordinate XB of the span end point.

When LRF is "0", i.e., YL$\geq$YR and Y_YM_E =0, that is, when the vertex R having the coordinate YM is not present between spans, each third selector selects a span end point as a reference point, and outputs the X-coordinate XB of the span end point. When LRF is "0" and Y_YM_E is "1", i.e., the vertex R having the coordinate YM is present between spans, each third selector selects a span end point as a reference point for sub-spans having Y-coordinates smaller than YM (the corresponding selection signal SEL is "1"), and outputs the X-coordinate XB of the span end point. For sub-spans having Y-coordinates equal to or larger than YM (the selection signal is "0"), each third selector selects the vertex R as a reference point, and outputs the X-coordinate XR of the vertex R.

A selector 84a selects and outputs "0" (in practice, a value having the same number of bits as that of EXR7S) when the signal SEL0 is "1", and EXR7S when the signal SEL0 is "0".

A selector 84b selects and outputs EXR1_1S when the signal SEL1 is "1", and EXR6S when the signal SEL1 is "0".

A selector 84c selects and outputs EXR1_2S when the signal SEL2 is "1", and EXR5S when the signal SEL2 is "0".

A selector 84d selects and outputs EXR1_3S when the signal SEL3 is "1", and EXR4S when the signal SEL3 is "0".

A selector 84e selects and outputs EXR1_4S when the signal SEL4 is "1", and EXR3S when the signal SEL4 is "0".

A selector 84f selects and outputs EXR1_5S when the signal SEL5 is "1", and EXR2S when the signal SEL5 is "0".

A selector 84g selects and outputs EXR1_6S when the signal SEL6 is "1", and EXR1S when the signal SEL6 is "0".

A selector 84h selects and outputs EXR1_7S when the signal SEL7 is "1", and "0" (in practice, a value having the same number of bits as that of EXR1_7S) when the signal SEL7 is "0".

Subsequently, an adder 85a adds the output from the selector 84a to the output from the selector 83a, and outputs the sum as EX0.

An adder 85b adds the output from the selector 84b to the output from the selector 83b, and outputs the sum as EX1.

An adder 85c adds the output from the selector 84c to the output from the selector 83c, and outputs the sum as EX2.

An adder 85d adds the output from the selector 84d to the output from the selector 83d, and outputs the sum as EX3.

An adder 85e adds the output from the selector 84e to the output from the selector 83e, and outputs the sum as EX4.

An adder 85f adds the output from the selector 84f to the output from the selector 83f, and outputs the sum as EX5.

An adder 85g adds the output from the selector 84g to the output from the selector 83g, and outputs the sum as EX6.

An adder 85h adds the output from the selector 84h to the output from the selector 83h, and outputs the sum as EX7.

The X-coordinates of the end points of the respective sub-spans can be obtained by adding the change amounts output from the fourth selectors 84a to 84h to the X-coordinates of the reference points output from the third selectors 83a to 83h in this manner.

The above processes associated with XE0 to XE7 are concurrently executed to output XE0 to XE7 at once.

The above operation of the sub-span end point generating circuit 7 will be described next with reference to FIGS. 16A, 16B, 18A, and 18B. When, for example, the current span $P_n$ and the next span $P_{n+1}$ are located at the positions in FIG. 16A with respect to the triangle (the vertexes L and R may not be present between the spans, while the vertex S may be present between the spans), all the selection signals SEL0 to SEL7 are "1".

The sub-span end point generating circuit 7 therefore respectively adds 0, EXR1_1S, EXR1_2S, EXR1_3S, EXR1_4S, EXR1_5S, EXR1_6S, and EXR1_7S to the X-coordinate XE of the end point of the span $P_n$, and sets the respective sums as the X-coordinates XE0 to XE7 of the end points of the sub-spans $SP_0$ to $SP_7$.

Figure 18A:
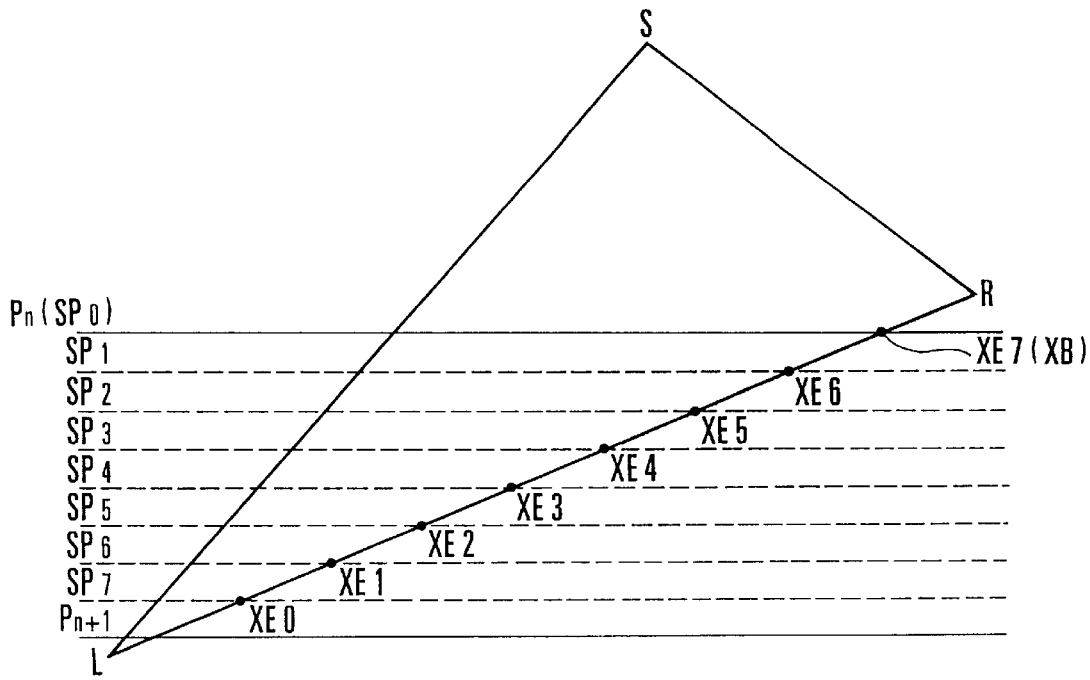
FIGS. 18A and 18B are views for explaining the operation of the sub-span end point generating circuit.

When the current span $P_n$ and the next span $P_{n+1}$ are located at the positions in FIG. 18A with respect to the triangle with LRF="0" (the vertex having the Y-coordinate YM may not be present between the spans, while the vertex having the maximum Y-coordinate may be present between the spans), all the selection signals SEL0 to SEL7 are "0".

The sub-span end point generating circuit 7 therefore respectively adds EXR7S, EXR6S, EXR5S, EXR4S, EXR3S, EXR2S, EXR1S, and 0 to the X-coordinate XB of the end point of the span $P_n$, and sets the respective sums as the X-coordinates XE0 to XE7 of the end points of the sub-spans $SP_0$ to $SP_7$.

Figure 18B:
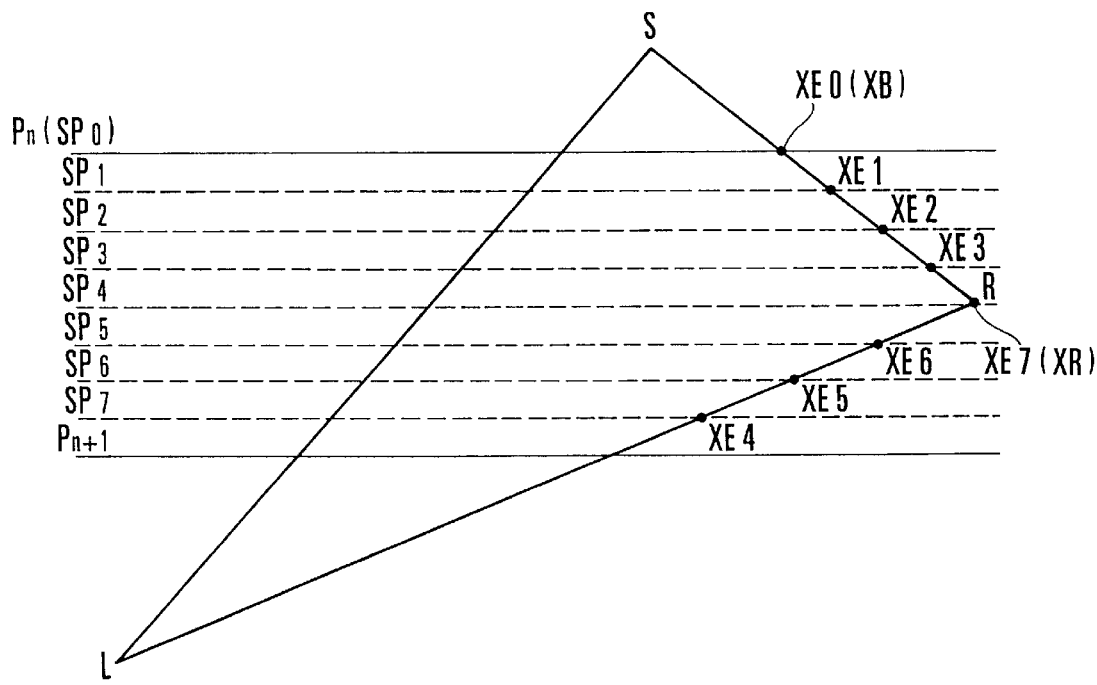

When the current span $P_n$ and the next span $P_{n+1}$ are located at the positions in FIG. 18B with respect to the triangle with LRF="0", the selection signals SEL0 to SEL3 become "1", and the selection signals SEL4 to SEL7 become "0".

The sub-span end point generating circuit 7 therefore respectively adds 0, EXR1_$_{-1}$S, EXR1_2S, and EXR1_3S to the X-coordinate XB of the end point of the span $P_n$, and sets the respective sums as the X-coordinates XE0 to XE3 of the end points of the respective sub-spans $SP_0$ to $SP_3$. The sub-span end point generating circuit 7 also respectively adds EXR3S, EXR2S, EXR1S, and 0 to the X-coordinate XR of the vertex R, and sets the respective sums as the X-coordinates XE4 to XE7 of the end points of the respective sub-spans $SP_4$ to $SP_7$.

As is obvious from the above description, the sub-span start point generating circuit 6 supplies the change amounts 0 and EXL1_$_{-1}$S to EXL1_7S to the selectors 74a to 74h in the increasing order of the Y-coordinates of the corresponding sub-spans, and also supplies EXL7S to EXL1S and 0 to the selectors 74a to 74h in the decreasing order of the Y-coordinates of the corresponding sub-spans. In addition, the selection signals SEL0 to SEL7 are used to perform selecting operation.

With this operation, for sub-spans having Y-coordinates smaller than YM, the X-coordinates of the start points of sub-spans arranged in the increasing order of Y-coordinates are obtained (the start point of the first sub-span coincides with the reference point). For sub-spans having Y-coordinates equal to or larger than YM, the X-coordinates of the start points of sub-spans arranged in the decreasing order of Y-coordinates are obtained (the start point of the last sub-span coincides with the reference point).

With this arrangement, all sub-span change amounts such as 0, ⅛ to ⅞ of EXL1 and ⅛ to ⅞ of EX2 need not be supplied to the selectors 74a to 74h, but only predetermined change amounts need to be supplied to the selectors 74a to 74h. This can simplify the arrangement of the sub-span start point generating circuit 6.

Similarly, the sub-span end point generating circuit 7 supplies the change amounts 0 and EXR1_1S to EXR1_7S to the selectors 74a to 74h in the increasing order of the Y-coordinates of the corresponding sub-spans, and also supplies EXR7S to EXR1S and 0 to the selectors 74a to 74h in the decreasing order of the Y-coordinates of the corresponding sub-spans. In addition, the selection signals SEL0 to SEL7 are used to perform selecting operation.

With this operation, for sub-spans having Y-coordinates smaller than YM, the X-coordinates of the end points of sub-spans arranged in the increasing order of Y-coordinates are obtained (the end point of the first sub-span coincides with the reference point). For sub-spans having Y-coordinates equal to or larger than YM, the X-coordinates of the end points of sub-spans arranged in the decreasing order of Y-coordinates are obtained (the end point of the last sub-span coincides with the reference point). In this manner, the same effect as that of the sub-span start point generating circuit 6 can be obtained.

A leftmost sub-span start point generating circuit 8 outputs a minimum X-coordinate XSL of the X-coordinates XS0 to XS7 of the start points of the respective sub-spans output from the sub-span start point generating circuit 6 in accordance with MXL1, MX2, MXR1, Y_YM_S, Y_YM_E, LRF, and DWE (step 205 in FIG. 4). Table 6 shows the operation of the leftmost sub-span start point generating circuit 8.

TABLE 6

Operation of Leftmost Sub-span Start Point Generating Circuit 8

| MXL1 | MX2 | MXR1 | Y_YM_S | Y_YM_E | LRF | DWE | XSL |
|---|---|---|---|---|---|---|---|
| positive | positive | x | 1 | x | 1 | x | XS0 |
| positive | positive | x | 0 | 1 | 1 | 1 | XS0 |
| x | positive | positive | 1 | x | 0 | x | XS0 |
| x | positive | positive | 0 | 1 | 0 | x | XS0 |
| positive | negative | positive | 1 | 0 | 0 | x | XS0 |
| positive | negative | positive | 0 | 1 | 0 | x | XS0 |

TABLE 6-continued

Operation of Leftmost Sub-span Start Point Generating Circuit 8

| MXL1 | MX2 | MXR1 | Y_YM_S | Y_YM_E | LRF | DWE | XSL |
|---|---|---|---|---|---|---|---|
| negative | negative | x | 0 | 1 | 0 | x | XS0 |
| positive | positive | x | 0 | 0 | 1 | x | XS7 |
| negative | positive | x | x | x | 1 | x | XS7 |
| negative | negative | x | 1 | x | 1 | x | XS7 |
| x | positive | positive | 0 | 0 | 0 | x | XS7 |
| negative | negative | positive | 1 | 0 | 0 | x | XS7 |
| positive | negative | positive | 0 | 0 | 0 | x | XS7 |
| x | negative | negative | 1 | x | 0 | x | XS7 |
| | | | others | | | 0001 | XS7 |
| | | | | | | 0010 | XS6 |
| | | | | | | 0011 | XS5 |
| | | | | | | 0100 | XS4 |
| | | | | | | 0101 | XS3 |
| | | | | | | 0110 | XS2 |
| | | | | | | 0111 | XS1 |
| | | | | | | 1000 | XS0 |

Figure 19A:
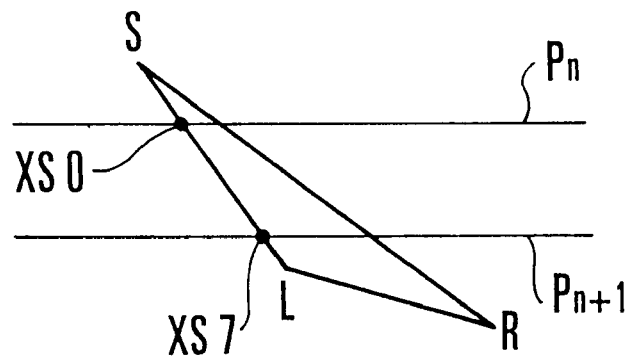
FIGS. 19A and 19B are views for explaining the operation of a leftmost sub-span start point generating circuit.

Consider the triangle shown in FIG. 19A that is obtained when LRF is "1" and both MXL1 and MX2 are positive. In this case, when Y_YM_S is "1", i.e., the current span $P_n$ and the next span $P_{n+1}$ are located at the positions in FIG. 19A, the minimum X-coordinate of the X-coordinates of the sub-span start points is XS0.

Figure 19B:
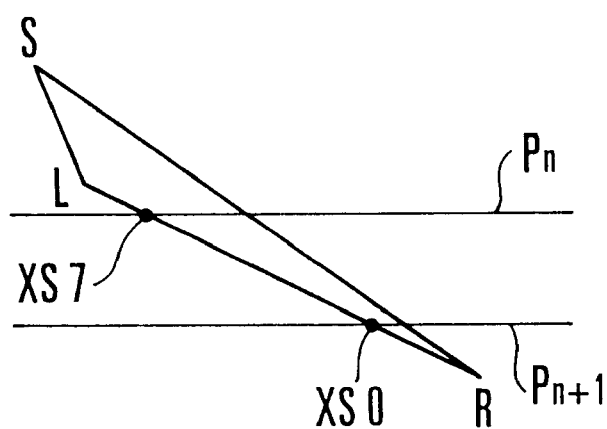

Similarly, consider the triangle shown in FIG. 19B that is obtained when LRF is "1" and both MXL1 and MX2 are positive. In this case, when both Y_YM_S and Y_YM_E are "0", i.e., the current span $P_n$ and the next span $P_{n+1}$ are located at the positions in FIG. 19B, the minimum X-coordinate of the X-coordinates of the sub-span start points is XS7. The same applies to other conditions.

In Table 6, "others" indicates a case in which the conditions for MXL1, MX2, MXR1, Y_YM_S, Y_YM_E, and LRF are not satisfied.

The minimum X-coordinate XSL of the start point of the sub-span may be selected by comparing the magnitudes of XS0 to XS7. However, each of XS0 to XS7 is a value consisting of several ten bits. To implement a circuit for comparing these values, therefore, the circuit size increases, and a long processing time is required.

With the arrangement of this embodiment, a reduction in circuit size and an increase in processing speed can be attained as compared with the circuit for comparing the magnitudes of XS0 to XS7.

A rightmost sub-span end point generating circuit 9 outputs a minimum X-coordinate XER of the X-coordinates XE0 to XE7 of the end points of the respective sub-spans output from the sub-span end point generating circuit 7 in accordance with MXL1, MX2, MXR1, Y_YM_S, Y_YM_E, LRF, and DWE concurrently with the output from the leftmost sub-span start point generating circuit 8 (step 205 in FIG. 4). Table 7 shows the operation of the rightmost sub-span end point generating circuit 9.

TABLE 7

Operation of Rightmost Sub-span End Point Generating Circuit 9

| MXL1 | MX2 | MXR1 | Y_YM_S | Y_YM_E | LRF | DWE | XER |
|---|---|---|---|---|---|---|---|
| x | negative | negative | 1 | x | 0 | x | XE0 |
| negative | x | negative | 1 | x | 1 | 1 | XE0 |
| negative | x | negative | 0 | 1 | 1 | x | XE0 |
| negative | negative | negative | 0 | 1 | 1 | x | XE0 |
| x | negative | negative | 0 | 1 | 0 | x | XE0 |
| x | positive | positive | 0 | 0 | 0 | x | XE0 |
| x | positive | positive | 0 | 0 | 1 | x | XE0 |
| x | negative | negative | 0 | 1 | 0 | x | XE7 |
| x | negative | positive | x | x | 0 | x | XE7 |
| x | positive | positive | 1 | x | 0 | x | XE7 |
| positive | positive | x | 1 | x | 1 | x | XE7 |
| negative | positive | positive | 1 | x | 1 | x | XE7 |
| negative | positive | negative | 0 | 0 | 1 | x | XE7 |
| negative | negative | x | 0 | 0 | 1 | x | XE7 |
| | | | others | | | 0001 | XE7 |
| | | | | | | 0010 | XE6 |
| | | | | | | 0011 | XE5 |
| | | | | | | 0100 | XE4 |
| | | | | | | 0101 | XE3 |
| | | | | | | 0110 | XE2 |
| | | | | | | 0111 | XE1 |
| | | | | | | 1000 | XE0 |

The operation of the rightmost sub-span end point generating circuit 9 is similar to that of the leftmost sub-span start point generating circuit 8.

In Table 7, "others" indicates a case in which the conditions for MXR1, MX2, MXL1, Y_YM_S, Y_YM_E, and LRF are not satisfied.

The minimum X-coordinate XER of the end point of the sub-span may be selected by comparing the magnitudes of XE0 to XE7. However, each of XE0 to XE7 is a value consisting of several ten bits. To implement a circuit for comparing these values, therefore, the circuit size increases, and a long processing time is required.

With the arrangement of this embodiment, a reduction in circuit size and an increase in processing speed can be attained as compared with the circuit for comparing the magnitudes of XE0 to XE7.

A rendering X-coordinate generating circuit 10 outputs the integral part of XSL output from the leftmost sub-span start point generating circuit 8 as the X-coordinate XD (integral part) of the first pixel to be rendered (step 206).

If, for example, the span $P_n$ subjected to processing is located at the position in FIG. 20 with respect to the triangle, the rendering X-coordinate generating circuit 10 outputs an integral part H of XSL as the X-coordinate XD of the first pixel on the span $P_n$.

Referring to FIG. 20, one pixel is a rectangular region surrounded by line segments which are parallel to the Y-axis and whose X-coordinates are integers (H, H+1, H+2, . . . ) and line segments which are parallel to the X-axis and whose Y-coordinates are integers (V, V+1, V+2).

A valid sub-span designating circuit 11 outputs signals VALID0 to VALID7 in accordance with the signals UPE and DWE output from the sub-span selection control circuit 4. The signals VALID0 to VALID7 correspond to XS0 to XS7 and XE0 to XE7, respectively, and indicate valid sub-spans of XS0 to XS7 and XE0 to XE7 (each signal becomes "1" when the corresponding sub-span is valid). Table 8 shows the operation of the valid sub-span designating circuit 11.

TABLE 8

Operation of Valid Sub-span Designating Circuit 11

| UPE | | DWE | |
|---|---|---|---|
| 0001 to 1000 | OR | 1000 | VALID0 = 1 |
| 0010 to 1000 | OR | 0111 to 1000 | VALID1 = 1 |
| 0011 to 1000 | OR | 0110 to 1000 | VALID2 = 1 |
| 0100 to 1000 | OR | 0101 to 1000 | VALID3 = 1 |
| 0101 to 1000 | OR | 0100 to 1000 | VALID4 = 1 |
| 0110 to 1000 | OR | 0011 to 1000 | VALID5 = 1 |
| 0111 to 1000 | OR | 0010 to 1000 | VALID6 = 1 |
| 1000 | OR | 0001 to 1000 | VALID7 = 1 |

The valid sub-span designating circuit 11 sets the signal VALID0 to "1" when the signal UPE is "0001" to "1000" or the signal DWE is "1000"; otherwise, the circuit 11 sets the signal VALID0 to "0".

The valid sub-span designating circuit 11 sets the signal VALID0 to "1" when the signal UPE is "0010" to "1000" or the signal DWE is "0111" to "1000"; otherwise, the circuit 11 sets the signal VALID0 to "0". The same applies to the remaining signals VALID2 to VALID7.

The function of the valid sub-span designating circuit 11 will be described below. When, for example, the current span $P_n$ and the next span $P_{n+1}$ are located with respect to the triangle as shown in FIGS. 12A, 12B, 12C, 12D, 12K, 12L, 12M, and 12N, there are sub-spans that do not cross any sides of the triangle between the span $P_n$ and the span $P_{n+1}$. These sub-spans are not subjected to rendering processing and hence invalid. The valid sub-span designating circuit 11 designates only the valid sub-spans that cross the sides of the triangle between the span $P_n$ and the span $P_{n+1}$.

A sub-span start point comparison circuit 12 compares the X-coordinates XD of each pixel output from the rendering X-coordinate generating circuit 10 with a corresponding one of XS0 to XS7 output from the sub-span start point generating circuit 6, and outputs a larger value as the X-coordinate of the start point of each sub-span in each pixel with the X-coordinate XD (step 207). For a sub-span for which a corresponding one of the signals VALID0 to VALID7 is set to "0", the X-coordinate of the start point is set to "0".

For example, in the pixel whose X- and Y-coordinates XD and YD are H and V, respectively (FIG. 20), since XS0 to XS7 are larger than XD, XS0 to XS7 are output as the X-coordinates of the start points of the sub-spans $SP_0$ to $SP_7$ in the pixel with the X-coordinate XD. Note that these processes are concurrently executed, and the processing results associated with the respective sub-spans are simultaneously output.

In the pixel whose X- and Y-coordinates XD and YD are H and V, respectively, since the sides of the triangle or its internal region do not overlap the sub-spans $SP_0$ to $SP_4$, the sub-spans $SP_0$ and $SP_4$ are invalid. Processing for such invalid sub-spans will be described later.

In the pixel whose X- and Y-coordinates XD and YD are H+1 and V, respectively, since XS0 to XS4 are larger than XE, XS0 to XS4 are output as the X-coordinates of the start points of the sub-spans $SP_0$ to $SP_4$ in this pixel, and XD is output as the X-coordinate of the start point of each of the sub-spans $SP_5$ to $SP_7$.

Concurrently with the sub-span start point comparison circuit 12, a sub-span end point comparison circuit 13 compares the value obtained by adding one to the X-coordinate XD of each pixel with a corresponding one of XE0 to XE7 output from the sub-span end point generating circuit 7, and outputs a larger value as the X-coordinate of the end point of each sub-span in the pixel with the X-coordinate XD (step 207). For a sub-span for which a corresponding one of the signals VALID0 to VALID7 is set to "0", the X-coordinate of the end point is set to "0".

For example, in the pixel whose X- and Y-coordinates XD and YD are H and V, respectively (FIG. 20), since H+1 is smaller than XE0 to XE7, H+1 is output as the X-coordinate of the end point of each of the sub-spans $SP_0$ to $SP_7$ in the pixel whose X-coordinate XD is H+1.

A sub-span difference calculating circuit 14 subtracts the X-coordinate of the start point of each sub-span, output from the sub-span start point comparison circuit 12, from the X-coordinate of the end point of each sub-span, output from the sub-span end point comparison circuit 13. The sub-span difference calculating circuit 14 then outputs this difference as the valid length of each sub-span in the pixel with the coordinate XD (step 208). The subtraction processes for the respective sub-spans are concurrently executed.

In the pixel whose X- and Y-coordinates XD and YD are H and V, respectively (FIG. 20), since H+1 is the X-coordinate of the end point of each of the sub-spans $SP_0$ to $SP_7$ and XS0 to XS7 are the X-coordinates of the start points of the sub-spans $SP_0$ to $SP_7$, the sub-span difference calculating circuit 14 subtracts each of XS0 to XS7 from H+1, and sets the results as the valid lengths of the sub-spans $SP_0$ to $SP_7$.

In this case, the differences with respect to the sub-spans $SP_0$ to $SP_7$ are negative values. The sub-span difference calculating circuit 14 sets the valid lengths of such sub-spans, for which the negative differences are obtained, to 0 (i.e., invalid). This is the processing for the invalid sub-spans in one pixel.

With regard to each sub-span for which a corresponding one of the signals VALID0 to VALID7 is set to "0", since both the X-coordinates of the start and end points are "0", the difference also becomes "0". With this operation, any sub-span that does not cross the triangle is set to be invalid.

A sub-span adding circuit 15 obtains the sum total of the valid lengths of the respective sub-spans output from the sub-span difference calculating circuit 14, and outputs the result as the area of the overlapping portion (overlapping value) SQ between the pixel with the coordinate XD and the triangle (step 209).

For example, in the pixel whose X- and Y-coordinates XD and YD are H and V, respectively (FIG. 20), the sum total of the valid lengths indicated by the thick lines is the overlapping area SQ between the pixel and the triangle.

In this manner, the overlapping area SQ between the pixel with the coordinate XD and the triangle can be obtained. The pixel processing section 106 performs rendering processing for this pixel, as previously described.

The rendering X-coordinate generating circuit 10 checks whether the X-coordinate XD of the current pixel is equal to the integral part of XER output from the rightmost sub-span end point generating circuit 9 (step 210). If they are not equal, the rendering X-coordinate generating circuit 10 adds 1 to the X-coordinate XD of the current pixel (step 211), and outputs the sum as the X-coordinate XD of the pixel to be processed next (step 206).

With this operation, the processing in steps 207 to 209 is executed in the same manner as described above. If, for example, the X- and Y-coordinates XD and YD of the pixel that has been processed are H and V, respectively, the pixel whose X- and Y-coordinates XD and YD are H+1 and V, respectively, is processed next.

When similar processing is repeated, and the X-coordinate XD of the pixel becomes equal to the integral part of XER upon addition processing in step 211, the rendering X-coordinate generating circuit 10 sets the signal XEND to "1" to indicate that the processing for all the pixels overlapping the triangle is complete on the current span (in practice, the processing for the last pixel in steps 207 to 209 is performed while the signal XEND is output).

When, for example, the current span $P_n$ is located at the position in FIG. 20 with respect to the triangle, the X- and Y-coordinates XD and YD of the last pixel on this span are H+4 and V, respectively. When, therefore, XD becomes equal to H+4, the rendering X-coordinate generating circuit 10 sets the signal XEND to "1".

When this signal XEND is output, the rendering Y-coordinate generating circuit 1 checks whether the Y-coordinate YD of the current pixel is equal to the integral part of the Y-coordinate value YE (step 212). If they are not equal, the rendering Y-coordinate generating circuit 1 adds one to the Y-coordinate YD of the current pixel (step 213), and outputs the result as the Y-coordinate YD of the pixel to be processed next (step 201).

With this operation, the processing in steps 202 to 211 is executed in the same manner as described above. If, for example, the span for which processing is complete corresponds to a pixel with the Y-coordinate V, a pixel whose Y-coordinate is V+1 is processed next.

When similar processing is repeated, and the Y-coordinate YD of the span (pixel) becomes equal to the integral part of YE upon addition processing in step 213, all the processing performed by the sub-span processing section 103 is complete at the time of step 212 in which the processing for this span is complete.

According to present invention, the image processing apparatus includes the rendering Y-coordinate generating circuit, the span start point generating circuit, the span end point generating circuit, the sub-span start point generating circuit, the sub-span end point generating circuit, the leftmost sub-span start point generating circuit, the rightmost sub-span end point generating circuit, the rendering X-coordinate generating circuit, the sub-span start point comparison circuit, the sub-span end point comparison circuit, the sub-span difference calculating circuit, and the sub-span adding circuit. With this arrangement, a plurality of sub-spans in a pixel with the coordinates XD and YD are concurrently processed to obtain the area of the overlapping portion between the pixel and a triangular region. This apparatus can therefore execute anti-aliasing processing faster than the conventional image processing apparatus designed to sequentially process sub-spans.

This apparatus also includes the sub-span selection control circuit. In addition, the sub-span start point generating circuit is constituted by the first and second selectors and the first adders, and the sub-span end point generating circuit is constituted by the third and fourth selectors and the second adders. With this operation, since only predetermined change amounts need to be supplied to the second and fourth selectors, the arrangements of the sub-span start point generating circuit and the sub-span end point generating circuit can be simplified.

Furthermore, the leftmost sub-span start point generating circuit selects and outputs the minimum X-coordinate XSL of the X-coordinates of the start points of the respective sub-spans on the basis of the polarities of the slopes of the respective sides of the triangle. The rightmost sub-span end point generating circuit selects and outputs the maximum X-coordinate XER of the X-coordinates of the end points of the respective sub-spans on the basis of the polarities of the slopes of the respective sides of the triangle. With this operation, a reduction in circuit size and an increase in processing speed can be attained as compared with the case in which the magnitudes of the X-coordinates of the start points of the respective sub-spans are compared with each other, together with the magnitudes of the X-coordinates of the end points of the respective sub-spans.

What is claimed is:

1. An image processing apparatus for executing anti-aliasing processing to remove jagged portions of an edge of an output image in rendering processing for a triangular region surrounded with a vector image edge by obtaining an area of the triangular region in units of pixels overlapping the triangular region and performing rendering processing for the triangular region in units of pixels on the basis of the obtained area, comprising:

a rendering Y-coordinate generating circuit for outputting a Y-coordinate YD of each pixel, in a range from a Y-coordinate value of a vertex having a minimum Y-coordinate of Y-coordinates of three vertexes of the triangular region to a Y-coordinate value of a vertex having a maximum Y-coordinate, while increasing the coordinate by one every time processing for all pixels having the coordinate YD and overlapping the triangular region is complete;

a span start point generating circuit for setting a point having a minimum X-coordinate, of points located on sides of the triangular region and having a minimum Y-coordinate, as a start point of a span $P_n$ which is parallel to an X-axis, has the Y-coordinate YD, and is currently processed, in an interval between the span $P_n$ and a span $P_{n+1}$ which has a Y-coordinate YD+1 and is to be processed next, and outputting an X-coordinate XA of the start point;

a span end point generating circuit for setting a point having a maximum X-coordinate, of points located on the sides of the triangular region and having a minimum Y-coordinate, as an end point of the span $P_n$, and outputting an X-coordinate XB of the end point;

a sub-span start point generating circuit for obtaining intersections having minimum X-coordinates, of intersections of the sides of the triangular region and a plurality of sub-spans that divide a region between the spans, in units of sub-spans at once, on the basis of the X-coordinate XA of the start point of the span output from said span start point generating circuit, setting the obtained intersections as start points of the respective sub-spans, and outputting X-coordinates of the respective start points;

a sub-span end point generating circuit for obtaining intersections having maximum X-coordinates, of intersections of the sides of the triangular region and a plurality of sub-spans that divide a region between the spans, in units of sub-spans at once, on the basis of the X-coordinate XB of the end point of the span output from said span end point generating circuit, setting the obtained intersections as end points of the respective sub-spans, and outputting X-coordinates of the respective end points;

a leftmost sub-span start point generating circuit for outputting a minimum X-coordinate XSL of the X-coordinates of the start points of the respective sub-spans output from said sub-span start point generating circuit;

a rightmost sub-span end point generating circuit for out-putting a maximum X-coordinate XER of the X-coordinates of the end points of the respective sub-spans output from said sub-span end point generating circuit;

a rendering X-coordinate generating circuit for outputting an X-coordinate XD of each pixel, in a range from the X-coordinate XSL to the X-coordinate XER, while increasing the X-coordinate XD by one every time processing for one pixel is complete;

a sub-span start point comparison circuit for comparing the X-coordinate XD of the pixel with the X-coordinate of the start point of each sub-span output from said sub-span start point generating circuit, and outputting a larger X-coordinate as the X-coordinate of the start point of each sub-span in the pixel with the coordinate XD;

a sub-span end point comparison circuit for comparing a value obtained by adding one to the X-coordinate XD with the X-coordinate of the end point of each sub-span output from said sub-span end point generating circuit, and outputting a smaller X-coordinate as the X-coordinate of the end point of each sub-span in the pixel with the coordinate XD;

a sub-span difference calculating circuit for obtaining a valid length of each sub-span in the pixel with the coordinate XD by subtracting the X-coordinate of the start point of each sub-span, output from said sub-span start point comparison circuit, from the X-coordinate of the end point of each sub-span, output from said sub-span end point comparison circuit; and a sub-span adding circuit for obtaining a sum total of the valid lengths of the respective sub-spans output from said sub-span difference calculating circuit, and setting the result as an area of an overlapping portion between the pixel with the coordinate XD and the triangular region.

2. An apparatus according to claim 1, wherein said appartus further comprises a sub-span selection control circuit for outputting a selection signal indicating whether a Y-coordinate of each sub-span between the spans is smaller than YM, provided that a vertex, of three vertexes of the triangular region, which has a minimum Y-coordinate is represented by S, vertexes sequentially appearing counter-clockwise from the vertex S are respectively represented by L and R, Y-coordinates of the vertexes L and R are respectively represented by YL and RL, and a Y-coordinate of a vertex whose Y-coordinate comes between the Y-coordinate of the vertex S and the Y-coordinate of the vertex having the maximum Y-coordinate is represented by YM, said sub-span start point generating circuit comprises:

a plurality of first selectors arranged in correspondence with the plurality of sub-spans to select the span start point as a reference point and output the X-coordinate XA of the span start point when YL≧YR, to select the span start point as a reference point and output the X-coordinate XA of the span start point when YL<YR and the vertex L having the coordinate YM is not present between the spans, to select the span start point as a reference point for a sub-span having a Y-coordinate smaller than YM and output the X-coordinate XA of the span start point when YL<YR and the vertex L is present between the spans, and to select the vertex L as a reference point for a sub-span having a Y-coordinate not less than YM and output the X-coordinate of the vertex L when YL<YR and the vertex L is present between the spans, a plurality of second selectors arranged in correspondence with the plurality of sub-spans and having first input terminals to which change amounts from the X-coordinate of the reference point to the X-coordinates of a plurality of sub-span start points on a side SL are input in an increasing order of the Y-coordinates of the sub-span start points, and second input terminals to which change amounts from the X-coordinate of the reference point to the X-coordinates of a plurality of sub-spans on a side LR are input in a decreasing order of the Y-coordinates of the sub-span start points, so as to select a first input terminal side when YL≧YR, the first input terminal side for a sub-span having a Y-coordinate smaller than YM when YL<YR, and a second input terminal side for a sub-span having a Y-coordinate not less than YM when YL<YR, and a plurality of first adders arranged in correspondence with the plurality of sub-spans to add outputs from said first and second selectors in units of corresponding sub-spans; and said sub-span end point generating circuit comprises:

a plurality of third selectors arranged in correspondence with the plurality of sub-spans to select the span end point as a reference point and output the X-coordinate XB of the span end point when YL<YR, to select the span end point as a reference point and output the X-coordinate XB of the span end point when YL≧YR and the vertex R having the coordinate YM is not present between the spans, to select the span end point as a reference point for a sub-span having a Y-coordinate smaller than YM and output the X-coordinate XB of the span end point when YL≧YR and the vertex R is present between the spans, and to select the vertex L as a reference point for a sub-span having a Y-coordinate not less than YM and output the X-coordinate of the vertex L when YL≧YR and the vertex R is present between the spans, a plurality of fourth selectors arranged in correspondence with the plurality of sub-spans and having first input terminals to which change amounts from the X-coordinate of the reference point to the X-coordinates of a plurality of sub-span end points on a side SR are input in an increasing order of the Y-coordinates of the sub-span end points, and second input terminals to which change amounts from the X-coordinate of the reference point to the X-coordinates of a plurality of sub-spans on a side LR are input in a decreasing order of the Y-coordinates of the sub-span end points, so as to select a first input terminal side when YL<YR, the first input terminal side for a sub-span having a Y-coordinate smaller than YM when YL≧YR, and a second input terminal side for a sub-span having a Y-coordinate not less than YM when YL≧YR, and a plurality of second adders arranged in correspondence with the plurality of sub-spans to add outputs from said third and fourth selectors in units of corresponding sub-spans.

3. An apparatus according to claim 1, wherein said leftmost sub-span start point generating circuit selects and outputs the minimum X-coordinate XSL of the X-coordinates of the start points of the respective sub-spans on the basis of signs of slopes of the respective sides of the triangular region, and said rightmost sub-span end point generating circuit selects and outputs the maximum X-coordinate XER of the X-coordinates of the end points of the respective sub-spans on the basis of the signs of the slopes of the respective sides of the triangular region.

4. An apparatus according to claim 3, wherein when a vertex, of three vertexes of the triangular region, which has a minimum Y-coordinate is represented by S, vertexes sequentially appearing counterclockwise from the vertex S are respectively represented by L and R, Y-coordinates of the vertexes L and R are respectively represented by YL and YR, and a Y-coordinate of a vertex whose Y-coordinate comes between the Y-coordinate of the vertex S and the Y-coordinate of the vertex having the maximum Y-coordinate is represented by YM;

said leftmost sub-span start point generating circuit selects a sub-span having a minimum Y-coordinate on a span when YL<YR and slopes EXL1 and EX2 of sides SL and LR are positive, selects a sub-span having a maximum Y-coordinate on the span when YL<YR, the slopes EXL1 and EX2 are respectively negative and positive, the coordinate YD is smaller than YM, and the vertex L having the coordinate YM is not present between spans, selects a sub-span crossing the vertex L when YL<YR, the slopes EXL1 and EX2 are respectively negative and positive, and the vertex L having the coordinate YM is present between the spans, selects a sub-span having a minimum Y-coordinate on the span when YL<YR, the slopes EXL1 and EX2 are respectively negative and positive, and the coordinate YD is larger than YM, selects a sub-span having a maximum Y-coordinate on the span when YL<YR and the slopes EXL1 and EX2 are negative;

selects a sub-span having a minimum Y-coordinate on the span when YL≧YR and the slope EXL1 is positive, selects a sub-span having a maximum Y-coordinate on the span when YL≧YR and the slope EXL1 is negative, and outputs the X-coordinate of the start point of the selected sub-span as the X-coordinate XSL; and said rightmost sub-span end point generating circuit selects a sub-span having a minimum Y-coordinate on a span when YL≧YR and a slope EXR1 of the side SR and a slope EX2 are negative, selects a sub-span having a maximum Y-coordinate on the span when YL≧YR, the slopes EXR1 and EX2 are respectively positive and negative, the coordinate YD is smaller than YM, and the vertex R having the coordinate YM is not present between spans, selects a sub-span crossing the vertex R when YL≧YR, the slopes EXR1 and EX2 are respectively negative and positive, and the vertex R having the coordinate YM is present between the spans, selects a sub-span having a minimum Y-coordinate on the span when YL≧YR, the slopes EXR1 and EX2 are respectively positive and negative, and the coordinate YD is larger than YM, selects a sub-span having a maximum Y-coordinate on the span when YL≧YR and the slopes EXR1 and EX2 are positive;

selects a sub-span having a minimum Y-coordinate oil the span when YL<YR and the slope EXR1 is negative, selects a sub-span having a maximum Y-coordinate on the span when YL<YR and the slope EXR1 is positive, and outputs the X-coordinate of the end point of the selected sub-span as the X-coordinate XER.

* * * * *

UNITED STATES PATENT AND TRADEMARK OFFICE
CERTIFICATE OF CORRECTION

PATENT NO.   : 6,166,717,
DATED        : December 26, 2000
INVENTOR(S)  : S. Nakayama Page 1 of 1

It is certified that error appears in the above-identified patent and that said Letters Patent is hereby corrected as shown below:

Column 11,
Line 63, "E.." should read -- E. --

Column 14,
Line 51, "EXL$_{13}$7S" should read -- EXL_7S --

Column 17,
Line 37, "span : start" should read -- span start --

Column 21,
Line 25, "XE" should read -- XB --
Line 46, "EXR1_$_l$S" should read -- EXR1_1S --

Column 22,
Line 3, "EXL1_$_l$S" should read -- EXLR_1S --

Claims,
Column 28, claim 1,
Line 63, "coordinate by" should read -- coordinate YD by --

Column 32, claim 4,
Line 48, "oil" should read -- on --

Signed and Sealed this

Twenty-third Day of October, 2001

Attest:

NICHOLAS P. GODICI
*Attesting Officer*   *Acting Director of the United States Patent and Trademark Office*